Figure 1:
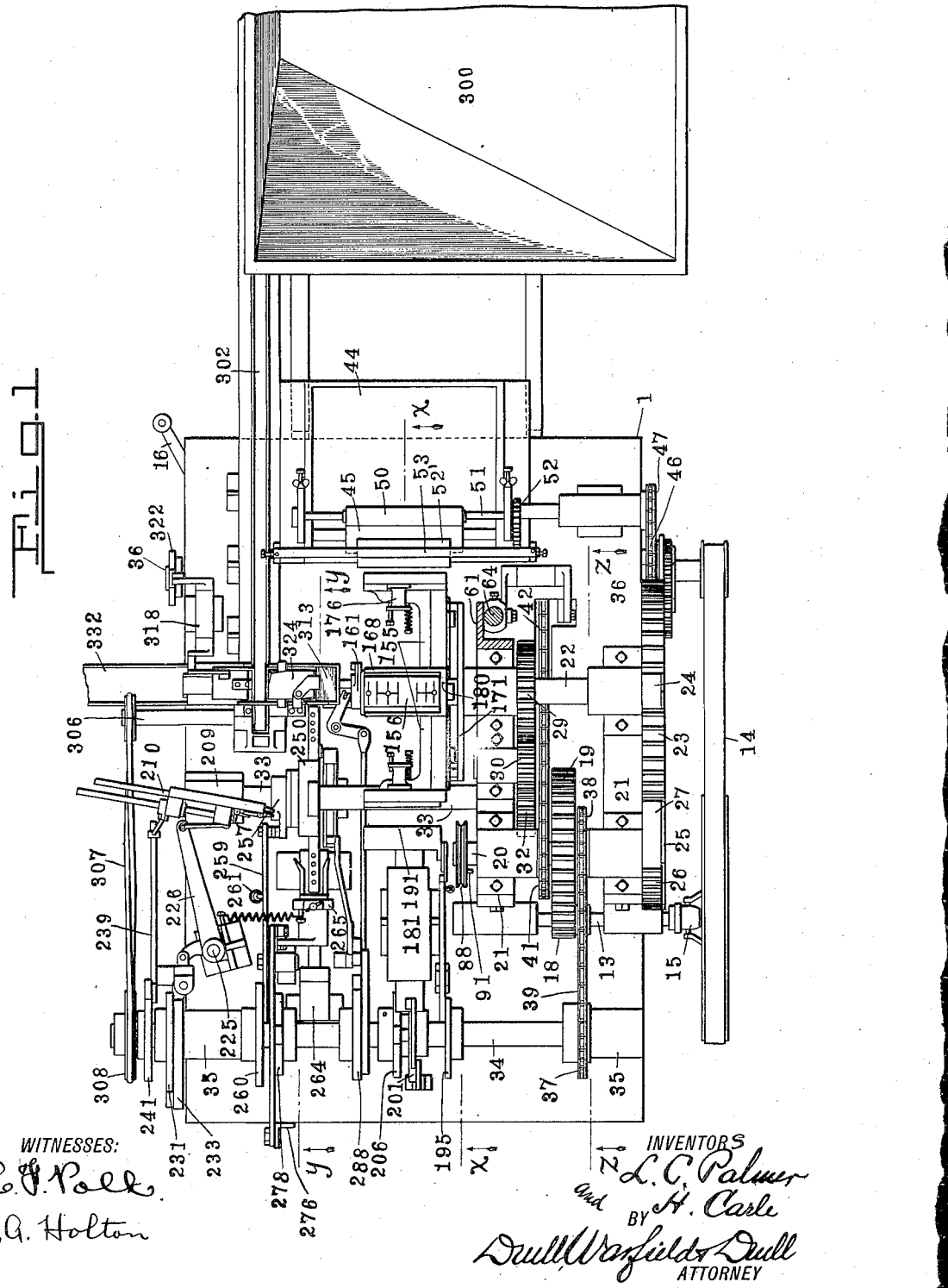

L. C. PALMER & H. CARLE.
SHELL MACHINE.
APPLICATION FILED JULY 9, 1914.

1,179,959.

Patented Apr. 18, 1916.
12 SHEETS—SHEET 2.

WITNESSES:

INVENTORS
L. C. Palmer & H. Carle
BY
Duell, Warfield & Duell
ATTORNEY

L. C. PALMER & H. CARLE.
SHELL MACHINE.
APPLICATION FILED JULY 9, 1914.

1,179,959.

Patented Apr. 18, 1916.
12 SHEETS—SHEET 5.

WITNESSES:

INVENTORS
L. C. Palmer and H. Carle
BY
Duell, Warfield & Duell
ATTORNEYS

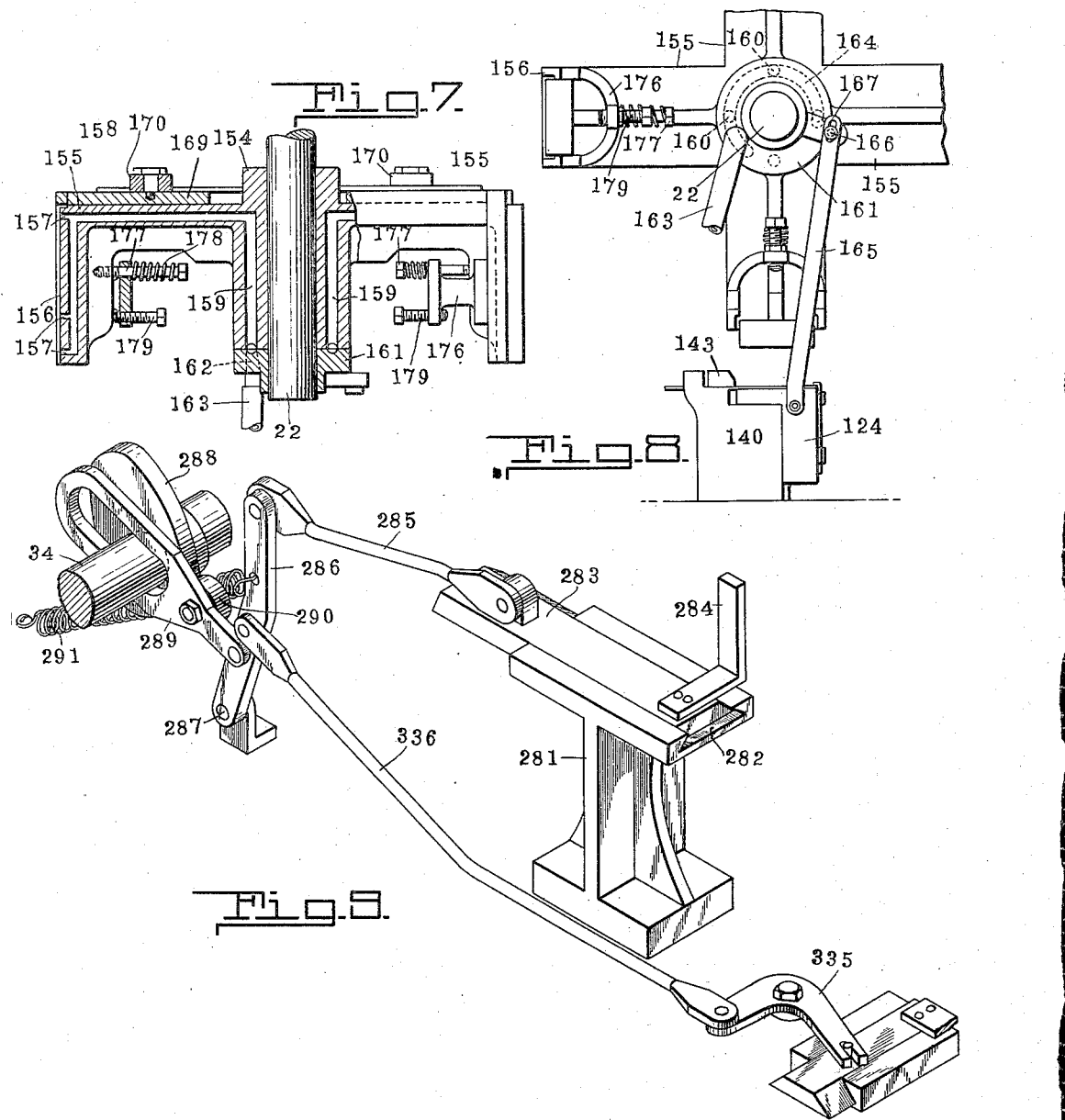

L. C. PALMER & H. CARLE.
SHELL MACHINE.
APPLICATION FILED JULY 9, 1914.

1,179,959.

Patented Apr. 18, 1916.
12 SHEETS—SHEET 7.

WITNESSES:
E. J. Polk
J. A. Holton

INVENTORS
L. C. Palmer and H. Carle
BY
Duell, Warfield & Duell
ATTORNEY

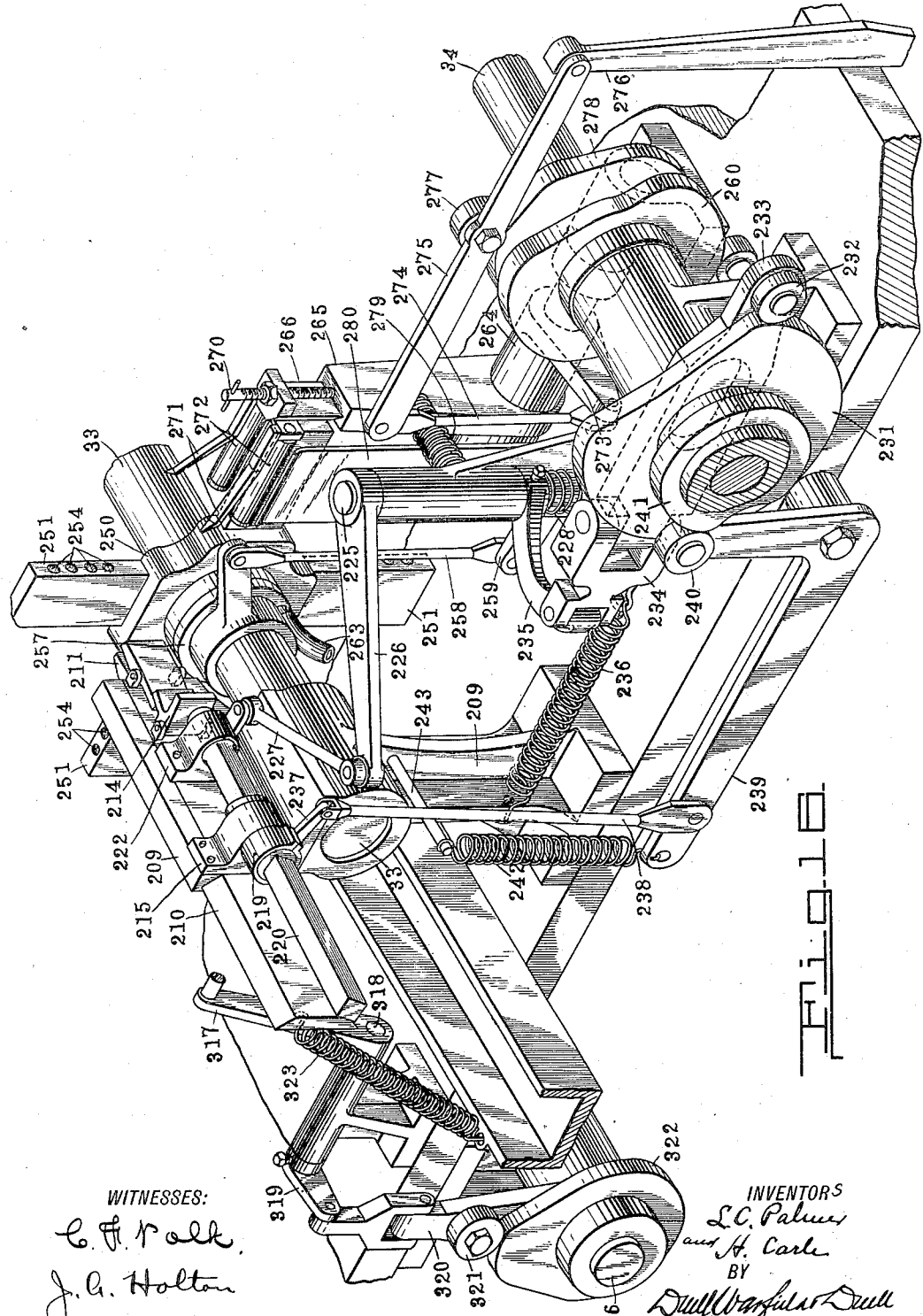

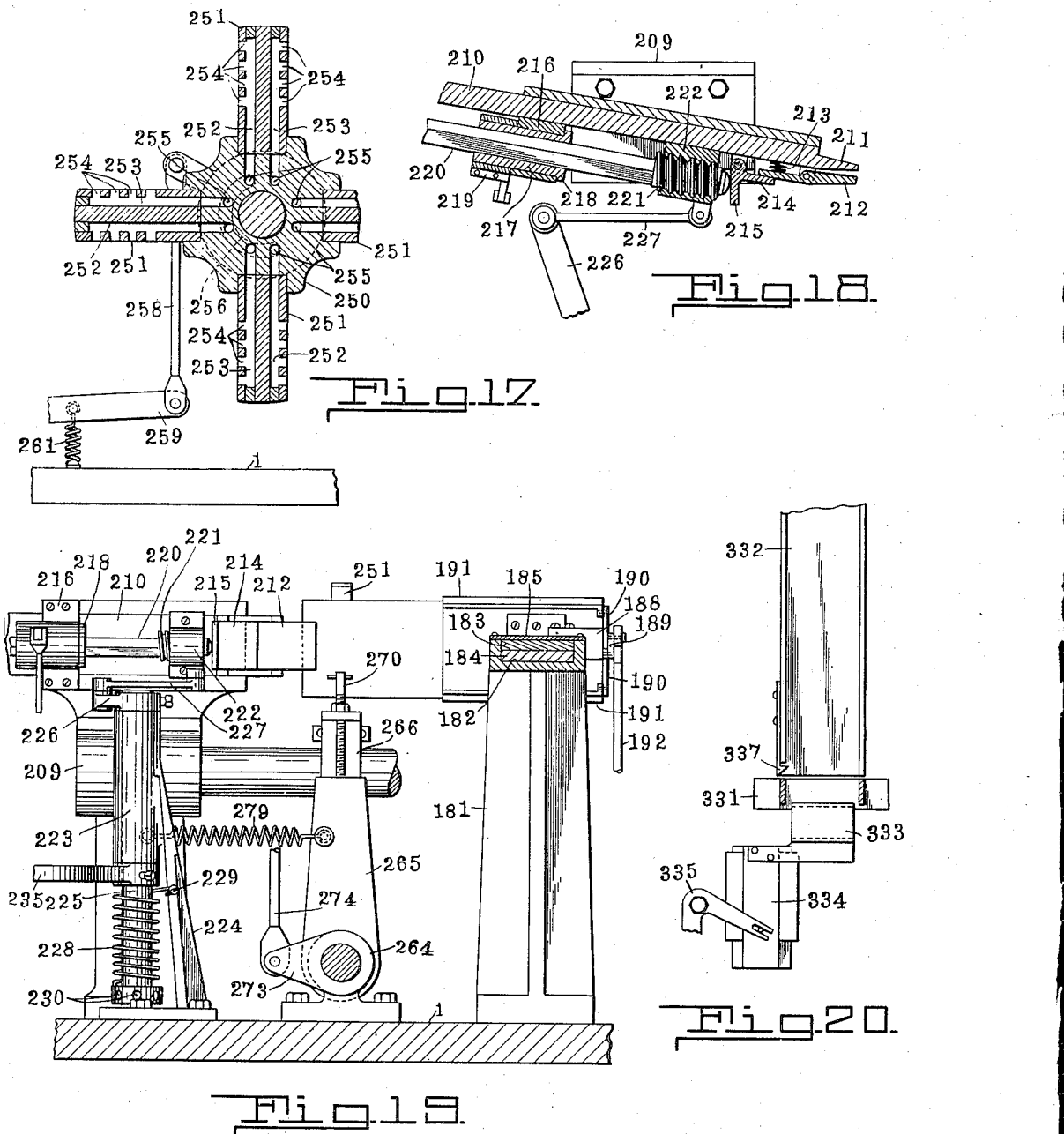

L. C. PALMER & H. CARLE.
SHELL MACHINE.
APPLICATION FILED JULY 9, 1914.
1,179,959.
Patented Apr. 18, 1916.
12 SHEETS—SHEET 10.
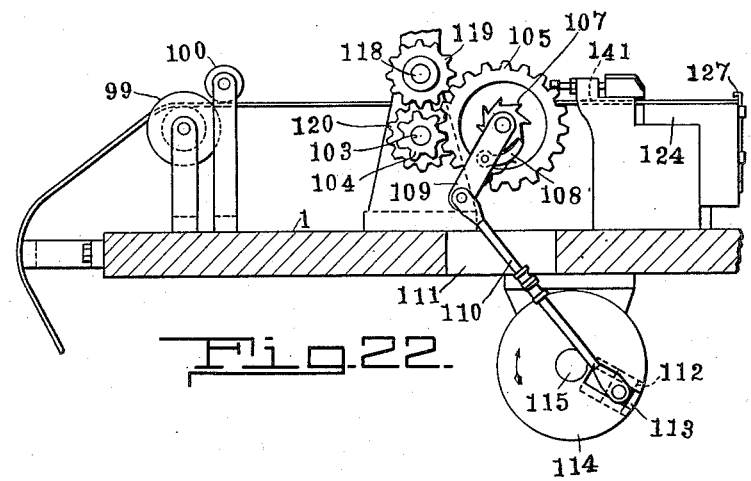
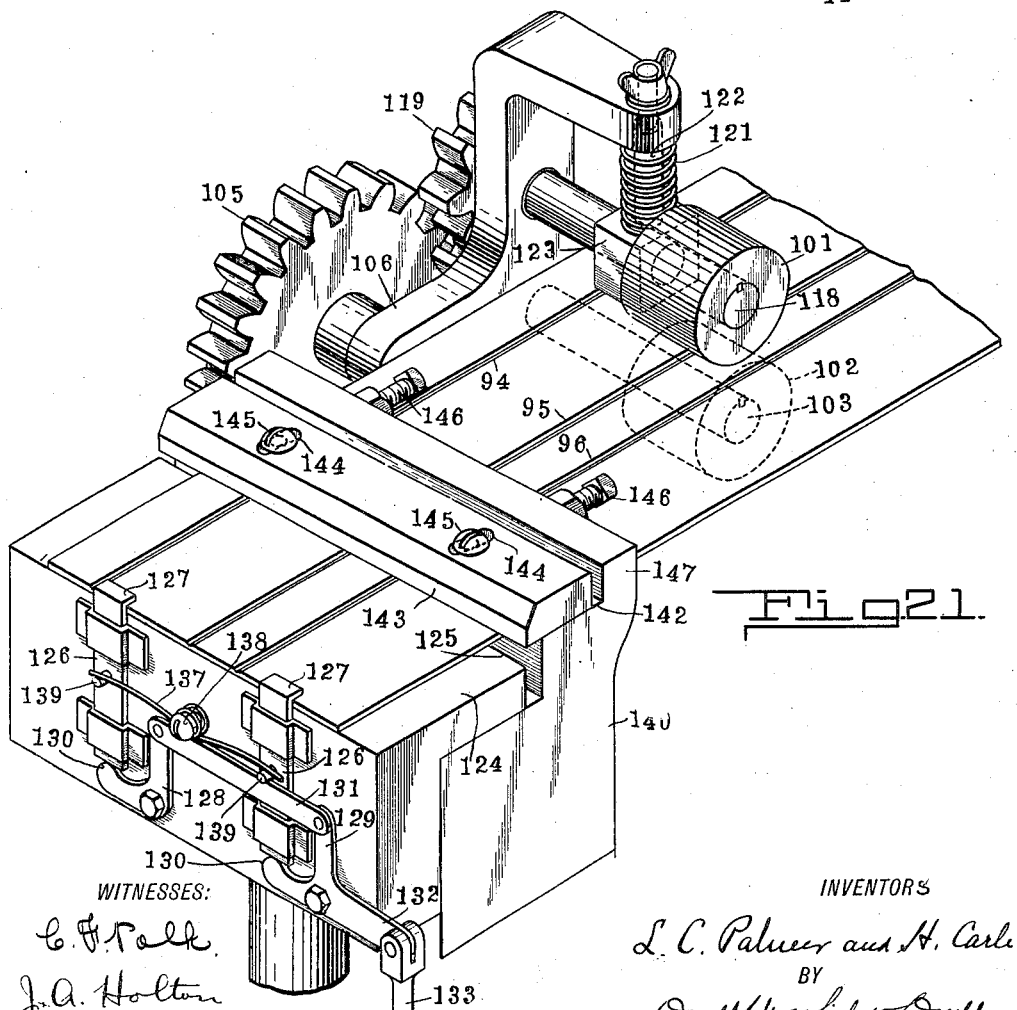

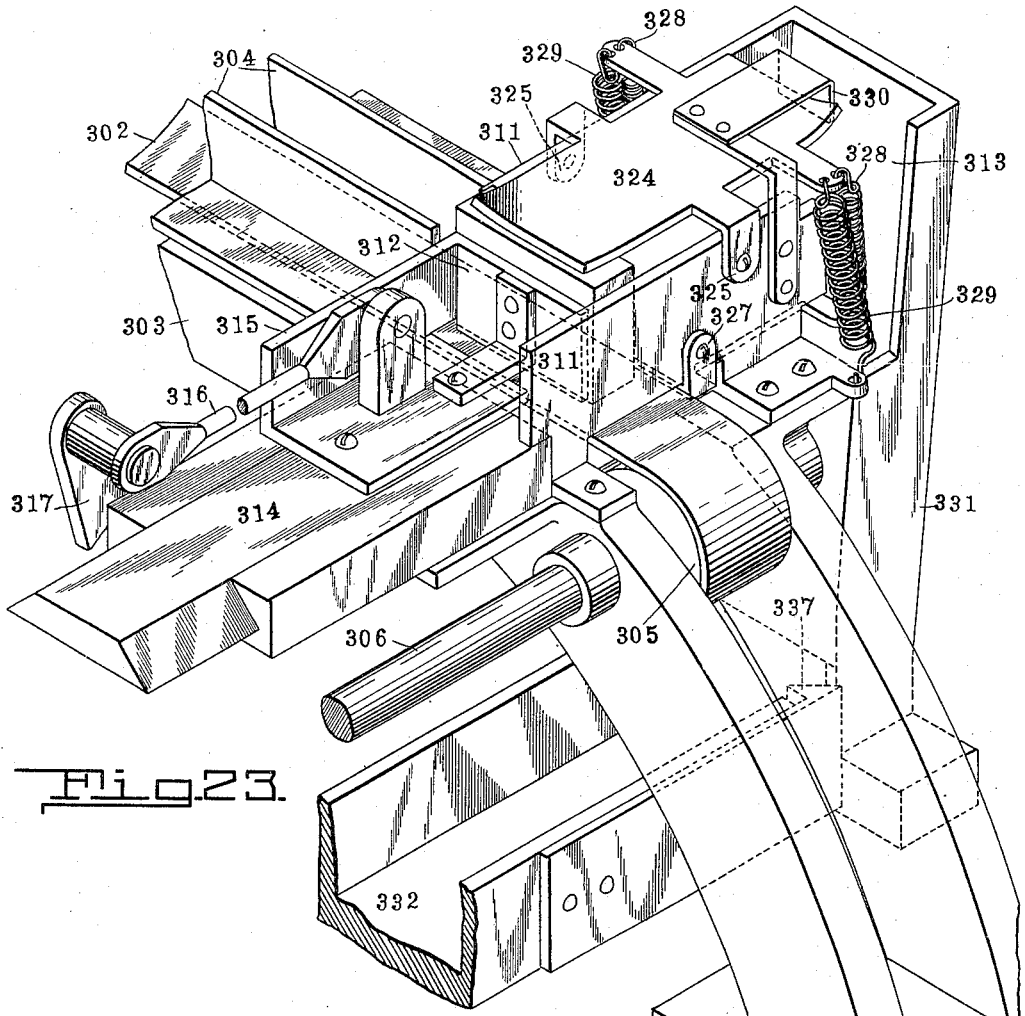
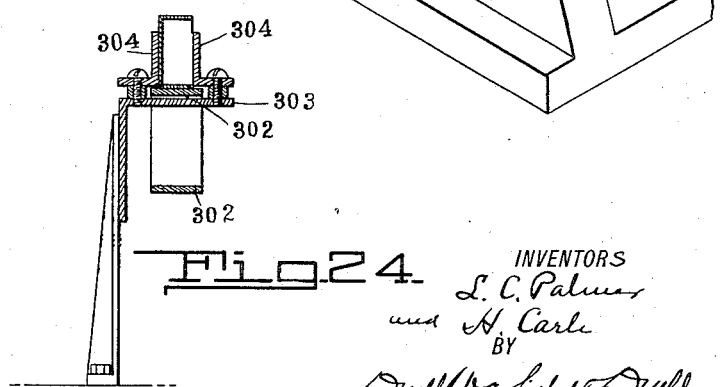

L. C. PALMER & H. CARLE.
SHELL MACHINE.
APPLICATION FILED JULY 9, 1914.

1,179,959.

Patented Apr. 18, 1916.
12 SHEETS—SHEET 12.

UNITED STATES PATENT OFFICE.

LYNDON C. PALMER AND HAROLD CARLE, OF BUFFALO, NEW YORK, ASSIGNORS TO F. N. BURT COMPANY, LIMITED, OF BUFFALO, NEW YORK, A CORPORATION OF CANADA.

SHELL-MACHINE.

1,179,959.  Specification of Letters Patent.  Patented Apr. 18, 1916.

Application filed July 9, 1914. Serial No. 849,869.

*To all whom it may concern:*

Be it known that we, LYNDON C. PALMER, a citizen of the United States, and HAROLD CARLE, a citizen of Canada and subject of the King of England, both residing at Buffalo, in the county of Erie and State of New York, have invented certain new and useful Improvements in Shell-Machines, of which the following is a full, clear, and exact description, such as will enable others skilled in the art to which it appertains to make and use the same.

This invention relates to box machines, and with respect to its more specific features, to means adapted to make paper shells or tubes which serve as casings for box elements, such as containers or trays, and involving mechanism to assemble the shells with the trays.

One of the objects of the invention is the provision of an efficient machine for making shells from material such as paper, or the like.

Another object of the invention is the provision of a practical machine for adhesively assembling a body-blank with a cover-blank in accurate predetermined relation to each other.

Another object of the invention is the provision of a machine of the character described involving simple and practical devices for folding portions of the cover-blank around the edges of the body-blank and adhesively securing the interfolded parts.

Still another object of the invention is the provision of a practical and efficient machine for folding the adhesively assembled blanks into a tube or shell.

Still another object of the invention is the provision of simple mechanism for automatically assembling shells with trays or drawers.

Other objects will be in part obvious and in part pointed out hereinafter.

The invention accordingly consists in the features of construction, combinations of elements and arrangement of parts which will be exemplified in the construction hereinafter set forth, and the scope of the application of which will be indicated in the following claims.

Figure 2:
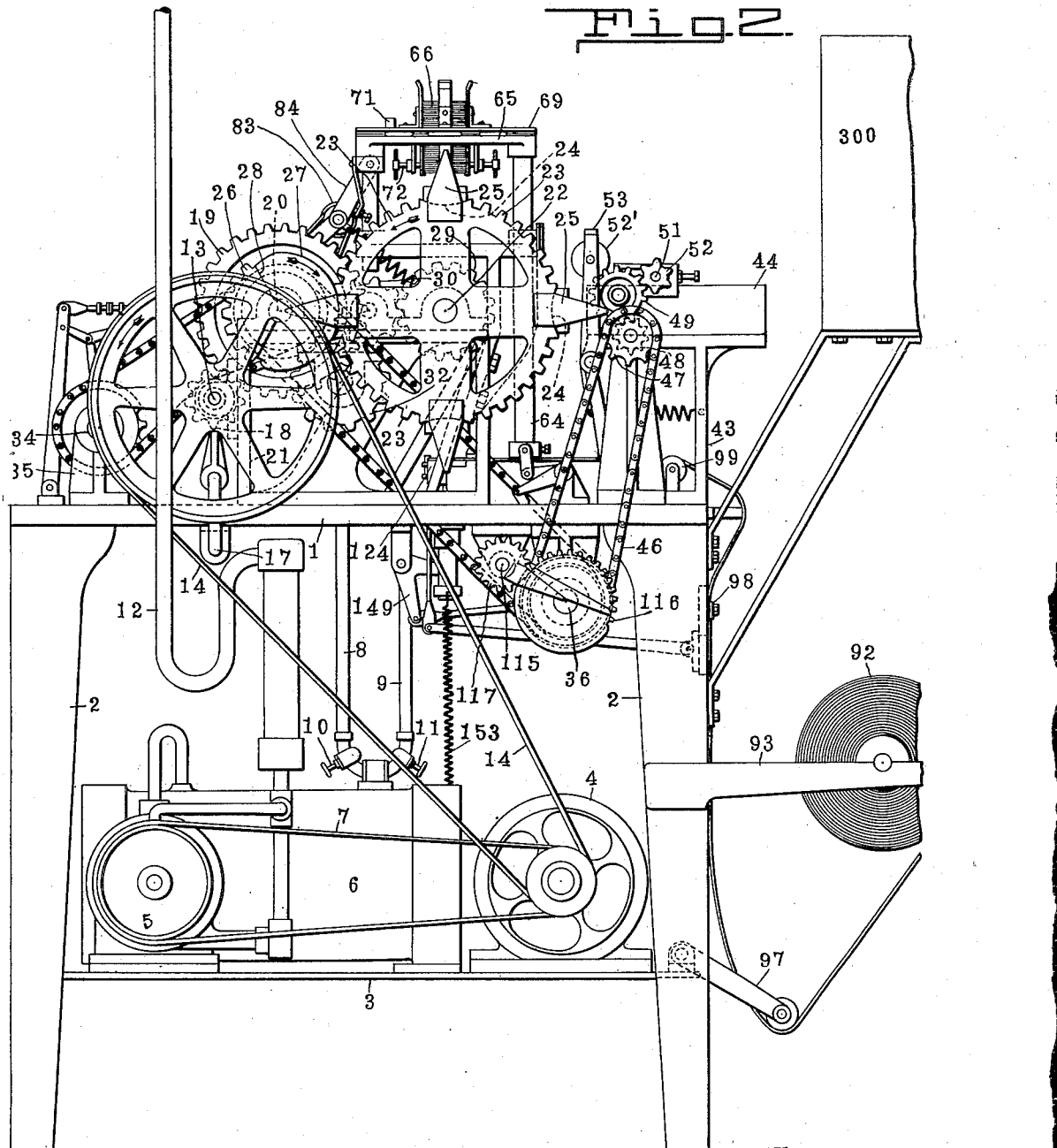
Figure 3:
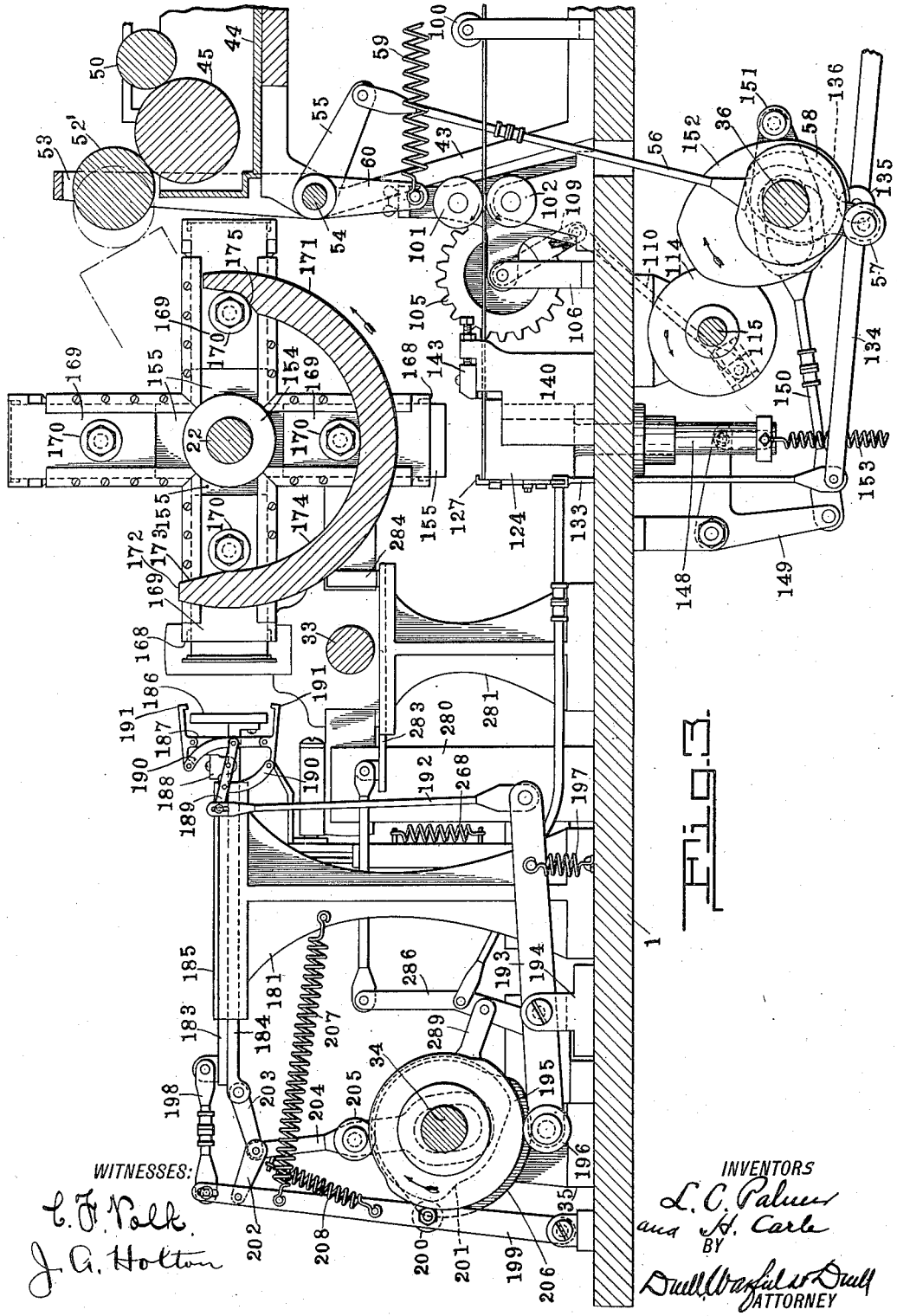
Figure 4:
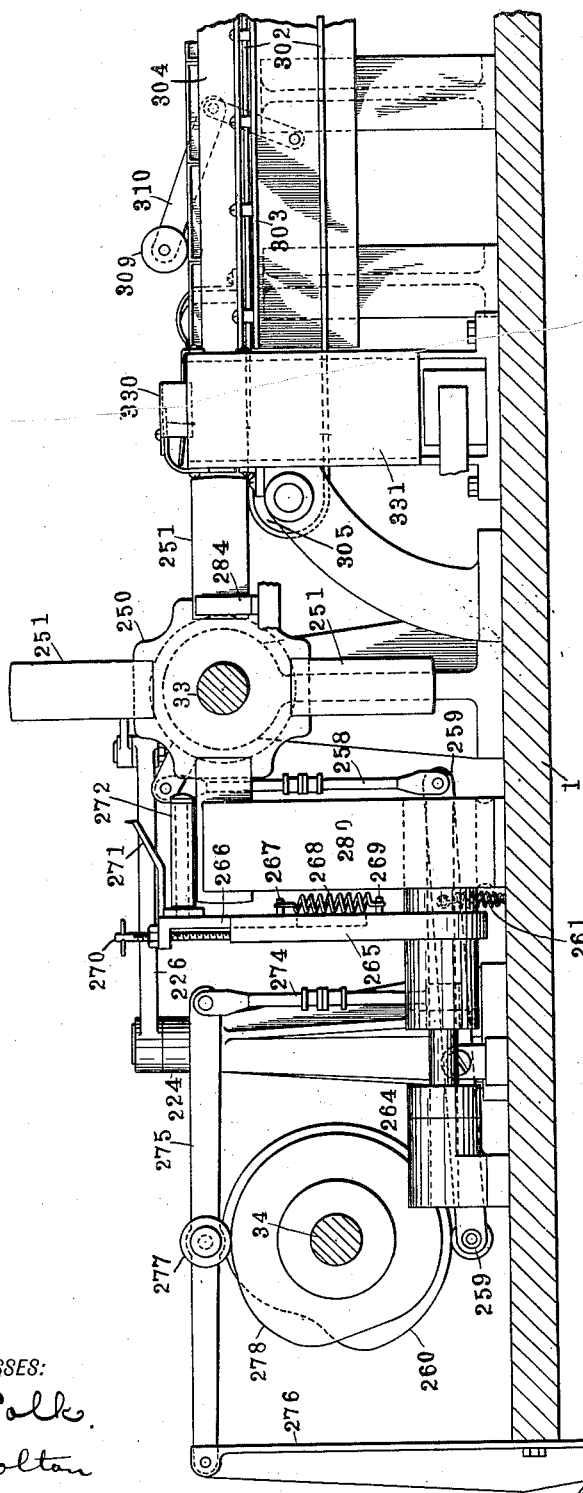
Figure 5:
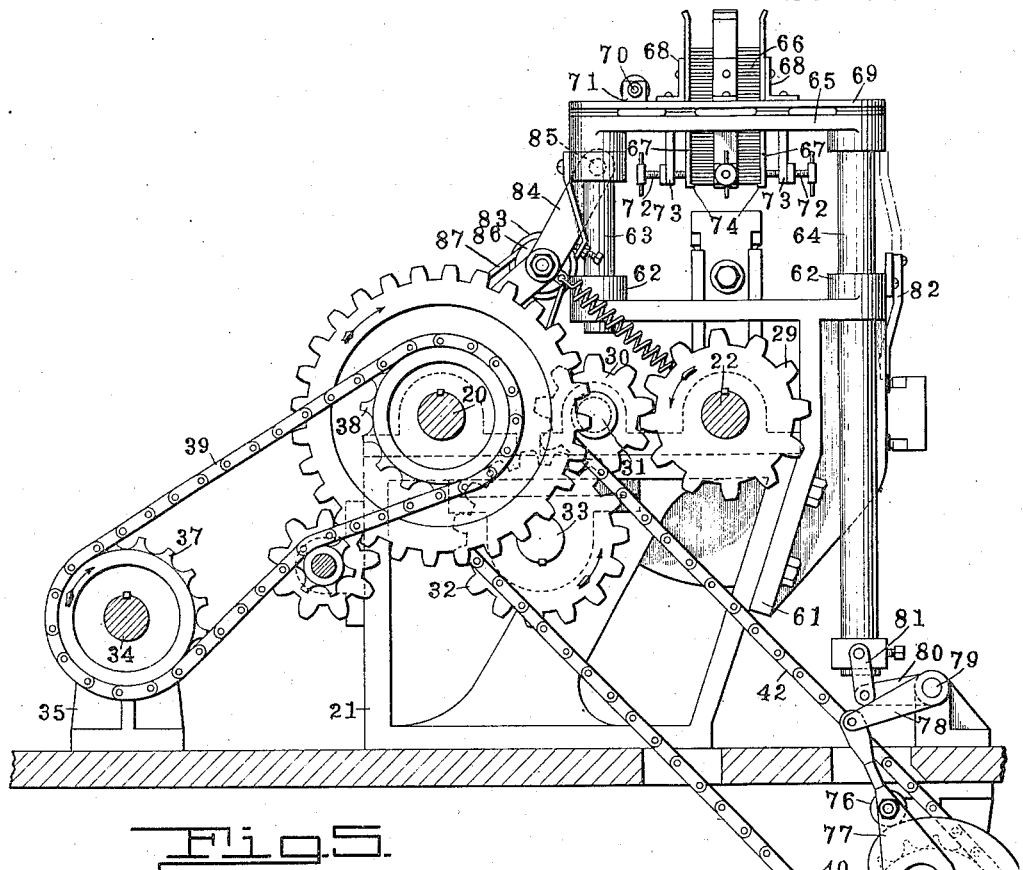
Figure 6:
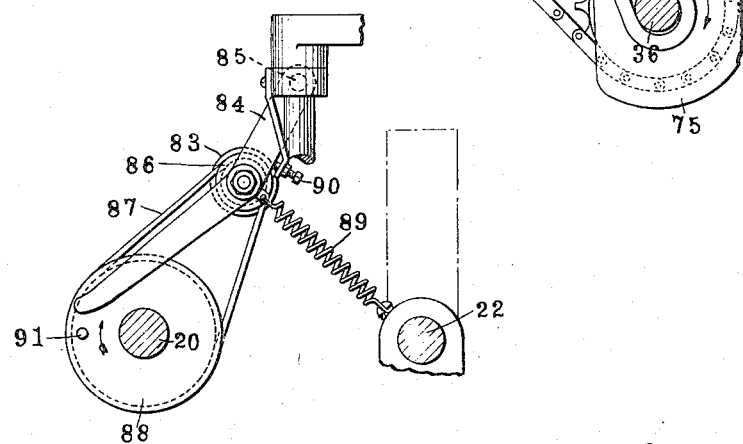
Figure 10:
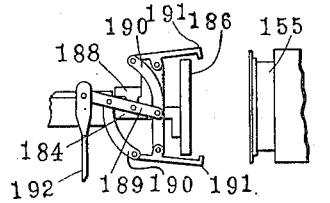
Figure 13:
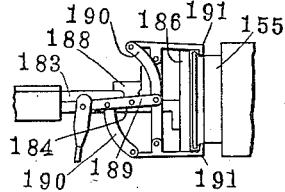
Figure 11:
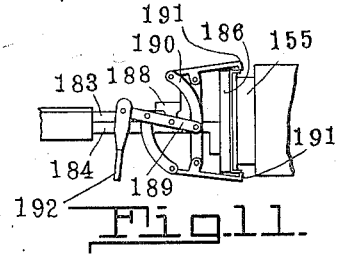
Figure 12:
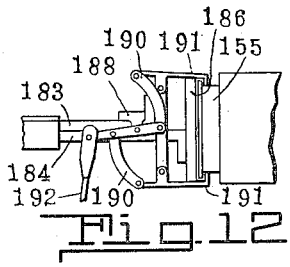
Figure 14:
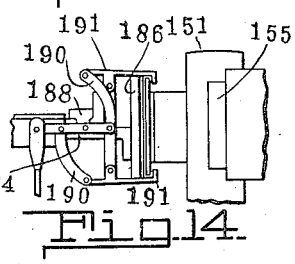
Figure 15:
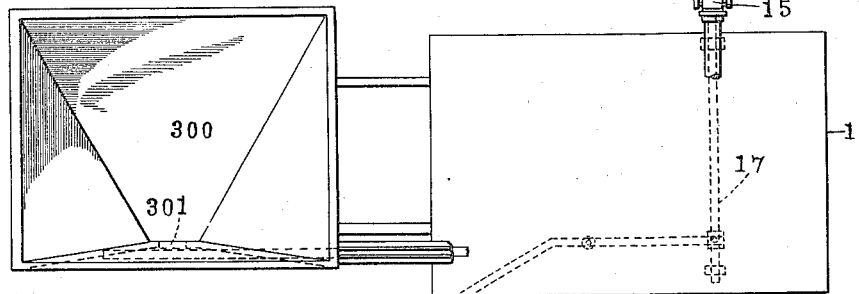
Figure 28:
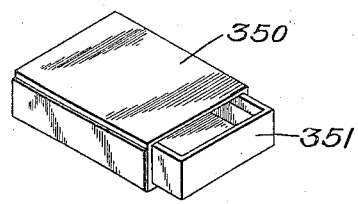
Figure 27:
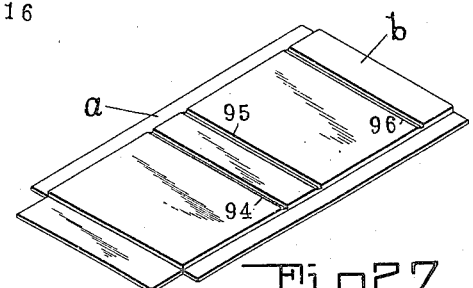
Figure 25:
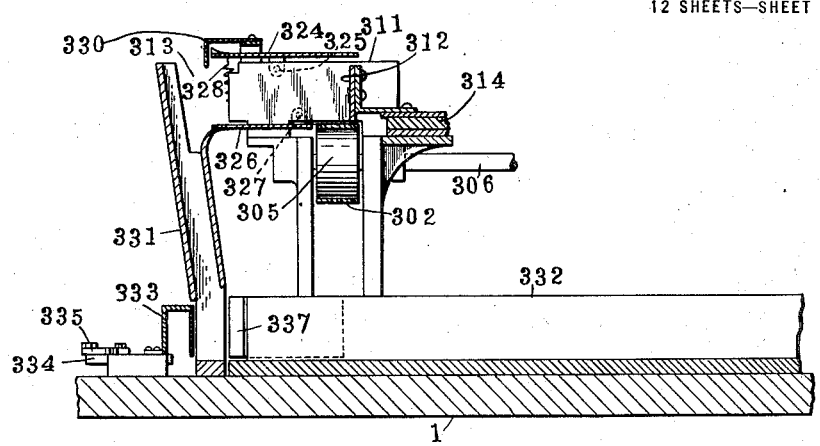
Figure 26:
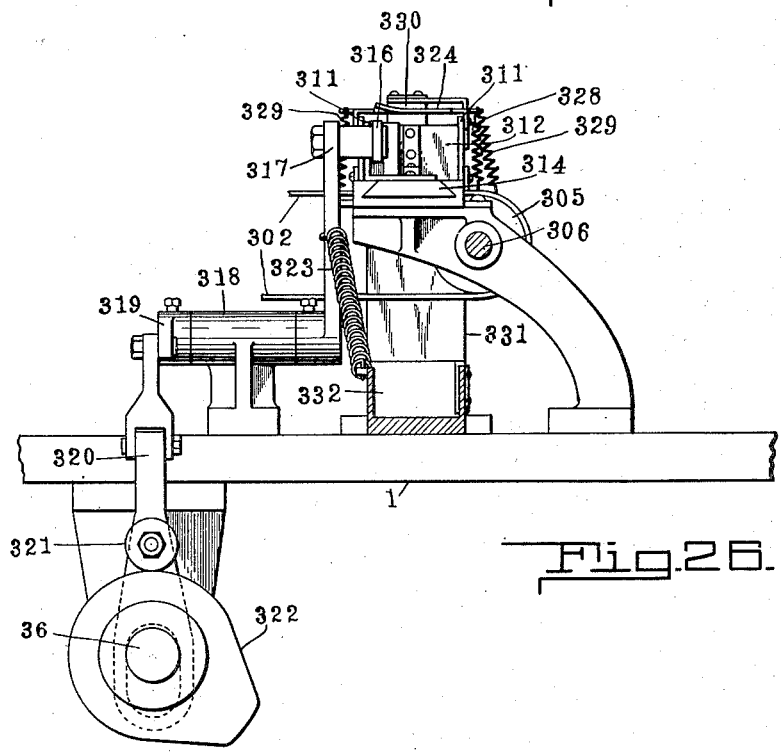

In the accompanying drawings forming a part of this specification showing one embodiment of the invention and wherein similar reference characters refer to similar parts throughout the several views, Figure 1 is a plan view of the machine; Fig. 2 is a rear elevation thereof; Fig. 3 is a vertical section of a portion of the machine taken on the line $x$—$x$, Fig. 1; Fig. 4 is a vertical elevation of a portion of the machine taken on the line $y$—$y$, Fig. 1; Fig. 5 is a vertical elevation of a detail of the machine taken on the line $z$—$z$, Fig. 1; Fig. 6 is a detail view of the device for pressing and smoothing the cover-blanks on the body-blanks; Fig. 7 is a plan view of the blank-carrier, partly in section; Fig. 8 is an elevation of the blank-carrier, partly broken away, showing also certain valve controlling devices associated therewith; Fig. 9 is a perspective view illustrating the shell stripper or pusher, the device for delivering or ejecting the assembled shells and trays to a receiver and operating mechanism therefor; Figs. 10 to 14 inclusive, illustrate the serial operations of certain positioning and folding devices employed in the machine; Fig. 15 is a plan view of the machine on a reduced scale and with most of the mechanism omitted, being primarily intended to illustrate the relative association of the tray hopper and the hand operated clutch shifting devices; Fig. 16 is a perspective view showing the tube or shell formers, the mechanism for transferring assembled blanks to said formers, and the mechanism coöperating with said formers to fold the blanks into tubes or shells; Fig. 17 is a detail vertical section through the shell formers, partly broken away, and also illustrating certain valve controlling mechanism associated therewith; Fig. 18 is a detail sectional view of the mechanism for gripping and transferring the blanks to the formers; Fig. 19 is a view of the blank transferring mechanism of Fig. 18 and its associated operative parts looking from the left in Fig. 1, and partly in section; Fig. 20 is a plan view of the delivering mechanism illustrated in Fig. 9; Fig. 21 is a perspective view of the body-web feeding and cutting mechanism, and certain associated parts; Fig. 22 is a section showing the body-web feeding mechanism and associated guides for the web; Fig. 23 is a perspective view illustrating the tray conveyer and guides for supplying trays into position to be assembled with the shells;

Fig. 24 is a sectional view showing the arrangement of the tray conveyer trough as associated with the tray conveyer belt; Fig. 25 is a sectional elevation illustrating the pusher for feeding trays in the position to receive shells coming from the former, and also illustrating the chute into which the assembled shells and trays pass after assembling; Fig. 26 is a detail illustrating the construction of the operating mechanism for the tray pusher; Fig. 27 is a view of the composite blank comprising the superposed body-blank and cover-blank; and Fig. 28 is a view of the completed shell, showing also the tray in position therein.

Referring now more specifically to the drawings, the numeral 1 indicates a table or supporting frame provided with suitable legs 2, between which latter is supported below the table, a shelf 3, supporting an electric motor 4, a rotary air pump 5 and an air chamber 6, a suitable belt 7, being disposed to drive the pump from the motor. Pipes 8 and 9 communicate with the air chamber 6 and hand operated valves 10 and 11 serve to control passage through said pipes. A pipe 12 leads from the discharge side of the pump 5 preferably into the open air. By the foregoing construction the operation of the pump 5 will serve to draw air from the chamber 6, expel it from the pipe 12, and when the valves 10 and 11 are open, air will be also drawn from the pipes 8 and 9 into the chamber 6 and expelled by the pump, thereby creating a reduction of pressure or partial vacuum in the pipes 8 and 9, and a similar reduction of pressure in openings leading to said pipes 8 and 9. The numeral 13 indicates a main drive shaft suitably supported above the table in bracket bearings, this shaft being driven from the motor 4 through the belt 14 and a drive pulley, the latter loosely mounted on the shaft 13 and adapted to be coupled thereto by means of a friction clutch 15 which may be operated from the lever 16 so as to throw the shaft 13 into and out of operation. The lever 16 is pivotally connected to a shift rod 17 having a suitable fork adapted to operate the clutch 15. Fixed to the main drive shaft is a small gear 18 which meshes with a larger pinion 19 mounted on a counter-shaft 20 supported in bearings on brackets 21 upstanding from the table 1, and these brackets also support a horizontal rotatable blank carrier shaft 22, on the outer end of which is a mutilated gear comprising four sets of teeth 23 with concave faces 24 intervening between the sets of teeth and with elongated starting teeth 25 opposite the concave peripheral portions 24, this mutilated gear coöperating with a mutilated gear 26 rotatable with said counter-shaft, and having a concentric smooth peripheral portion 27 adapted to coöperate at proper times with the concavities of the mutilated gear on the shaft 22. The size, proportion and relative number of teeth of the gears 23 and 26 are such that for every revolution of the mutilated gear 26 the carrier shaft 22 is rotated 90°, and held at rest between successive movements of 90° by the interlocking of the smooth peripheral portions of said respective gears. The mutilated gear 26 is provided with starting projections 28 with which the starting teeth 25 coöperate. By this construction it will be clear that the continuous rotation of the main drive shaft 13 will cause the intermittent rotation of the blank carrier shaft 22, each successive movement of said latter shaft being through an angle of 90°, and it will also be clear that between such successive movements the carrier shaft will be locked in position by the engagement of the smooth peripheral portions of the two mutilated gears. Viewed in some aspects it will be clear that any suitable form of mechanism might be employed to cause the intermittent movement of the carrier shaft without departing from the spirit of this invention, and hence applicant is not to be limited to the form thus specifically described. On the blank carrier shaft 22 is fixed a pinion 29 which meshes with an idler pinion 30 on a stud shaft 31, the latter in turn meshing also with a pinion 32 of the same size as the pinion 29 and keyed to a former shaft, or mandrel shaft, 33, which latter is mounted in bearings supported by the bracket 21. By this construction it will be perceived that the former shaft 33 is rotated intermittently and synchronously with the blank carrier shaft 22.

A main cam shaft 34 is journaled in bracket bearings 35 on the upper surface of the table 1 and another or auxiliary cam shaft 36 is journaled in brackets beneath the table 1, at the other end of said table. Each of the shafts 34 and 36 is driven from the counter-shaft 20, the former by sprocket wheels 37, 38 and chain 39, and the latter by sprocket wheels 40 and 41 and sprocket chain 42.

On the right hand side of the table looking at Fig. 1, are fastened supporting brackets 43 which support a reservoir or tank 44 adapted to receive suitable adhesive such as glue. Journaled in the walls of the tank 44 is a glue supply roller 45 which is disposed to dip into the glue in the tank, and is rotated from the auxiliary cam shaft 36 by sprocket and chain connections 46, 47 and intermeshing gears 48 and 49. The numeral 50 indicates a roller which is adapted to gage the thickness of the coat of glue on the roller 45 before said glue is applied to a glue transferring roller hereinafter referred to, said gage roller 50 being carried by a shaft 51 having a pinion 52 driven from the gear 49. The roller 50 is adjustable toward and from the glue supplying roller 45, as illustrated. An adhesive carrier such as a roller 52' is adapted to be moved into and out of contact with the glue supply roller 45 so as to be coated with glue from the supply roller and transfer the same to certain blanks and daubers hereinafter referred to, thereby coating said blanks and the dauber with adhesive. Said roller 52' is journaled in arms 53 upstanding from a rock shaft 54 journaled in bearings on the bracket 43 and said rock shaft has an arm 55 to which is pivoted an adjustable connecting rod 56 terminating in a follower comprising a cam roller 57 adapted to coöperate with a peripheral cam 58 rotating with the auxiliary cam shaft 36. Upon rotation of the cam 58 the transfer roller 52' is positively moved by the cam in a direction away from the carrier shaft and into contact with the glue supply roller 45, being held in contact with the latter so as to receive a supply of glue on its periphery. The cam 58 is so shaped that at the proper time a spring 59 attached to an arm 60 of the rock shaft 54 is permitted to move the transfer roller 52' away from the roller 45 and into simultaneous contact with a blank and a dauber, as will hereinafter appear.

Upstanding from the bracket 21 is a bracket 61 having guides or eyes 62 in which slide upright rods 63 and 64, the upper ends of said rods carrying a plate 65 on which is supported a magazine containing the supply or pack of cover-blanks or labels, 66, which are to be adhesively assembled with the body-blanks. The cover-blanks 66 are directly supported by a series of resilient fingers 67 carried by brackets 68, said brackets being adjustably secured to a cross plate 69 resting on the plate 65 and adjustable longitudinally of the machine by a rod 70 having threaded engagement with an ear 71 on the plate 69. Each of the fingers 67 is supported adjustably on the plate 69 and extends through a central opening in the plate 69, and adjustable screw-threaded pins 72 engage bracket pieces 73 carried by the plate 69, the rotation of the pins 72 tending to move the lower portions of the fingers 67 inwardly or outwardly, so as to form a fine adjustment for the distance between oppositely disposed fingers. Each of the fingers 67 has an inwardly extended flange or point 74 for engaging the lower portion of the pack of labels near its edge. By the above described construction the label magazine may be adjusted either longitudinally or transversely of the machine so that the same may be set in accurate predetermined position. The details of construction of the magazine containing the cover-blanks, or labels, and its adjustments need not be further described herein, as this part of the present device is similar to the label magazine disclosed in the application of Robinson Burt, filed July 10, 1913, Serial No. 778,255. It will be understood that, viewed in some aspects, any other suitable cover-blank supply device may be employed in place of the one herein described.

As will hereinafter appear, certain body-blank carriers come successively to rest beneath the cover-blank magazine, whereupon the latter is moved so that the lowermost cover-blank is superposed on and pressed against a body-blank on the carrier, the outer surface of the body-blank having been coated with adhesive. Thereupon this magazine is moved away from the body-blank on the carrier and the lowermost cover-blank of the pile adheres to the blank on the carrier and is stripped from the bottom of the pile. The movement of the magazine toward and from the blank carrier referred to, is accomplished through the instrumentality of a cam 75 on the auxiliary shaft 36, which cam coöperates with a roller 76 mounted on a follower 77, pivotally connected to an arm 78 by a rock shaft 79, another arm 80 of which latter is connected by a link 81 to a downward extension of the rod 64.

The numeral 82 represents a stop in the nature of a plate or rod pivoted to the bracket 61, which stop may be thrown into and out of position beneath the plate 65 and serve to maintain said plate and the label mechanism in upward position when desired.

A device is employed to press the adhering body-blanks and cover-blanks together and to spread or smooth the cover-blanks on the body-blanks, said mechanism preferably comprising a roller 83 rotatably mounted in two parallel arms 84 pivotally connected at 85 to the plate 65. On the shaft of the roller 83 is mounted a small belt pulley 86 engaged by a belt 87, which latter also engages a belt wheel 88 on the counter-shaft 20. A spring 89 is connected to one of the arms 84 and to the frame and tends to draw the roller 83 toward the path of the body-blanks on the carrier, their movement toward the path being limited by an adjustable stop 90 adapted to abut one of the arms 84 and supported in a bracket on the frame. The belt wheel 88 is provided with a cam or pin 91, which, as the pulley 88 rotates, engages the lower edge of one of the arms 84 and tends to move the arm around its pivot so as to carry the roller 83 in a direction away from the path of the blanks on the carrier. The pulleys effecting rotation of the pressing and smoothing roller 83 are so proportioned as to rotate the roller 83 with a peripheral speed the same as that of the blanks on the carrier so that the labels will be pressed and smoothed but not displaced on said carrier.

Although it is within the contemplation of this invention to supply the body-blanks to the machine, one by one, as from a magazine of such blanks, it is preferred to supply such blanks by severing the same from a continuous body-web as the machine operates. A suitable supply of body-web may be mounted in roll form, as shown at 92, on a bracket 93 extending from the frame. The blanks cut from this web are preferably of relatively heavy stock such as pasteboard, strawboard, cardboard, etc., and as this material forms the body portion of the article or shells the blanks cut therefrom are herein termed body-blanks. The width of the body-web is preferably substantially equal to the length of the transverse periphery of the shells or tubes to be formed therefrom, so that blanks severed from the body-web in a transverse direction may be folded in a direction corresponding to the width of the web and the opposite ends of such blanks abutted. The body-web is longitudinally scored along lines which in the completed article will correspond to the corners of the shells or tubes, the scoring being on the inner faces of such shells and preferably comprising grooves which are formed by removing the material of the web, as by means of scoring rollers which abrade the surface of the web and thus form said grooves. In the present instance three grooves 94, 95 and 96 are provided dividing the web into four longitudinal divisions corresponding in transverse dimension with the respective sides of the preferably rectangular shell to be formed. In the present instance the shell formed has a greater width than height and hence two of the divisions are smaller than the other two, all as clearly illustrated in Fig. 21.

From the supply roll 92 the body-web passes beneath a guide roller 97, thence upwardly beneath a tension plate 98, thence over a flanged guide roller 99, and beneath a coöperative keeper roller 100 supported on the upper surface of the table. The web then passes between two feed rollers 101 and 102, one above and the other below the web, which rollers may have roughened or knurled surfaces and are adapted to grip and feed the web intermittently as they are rotated. The lower roller 102 is carried by a shaft 103 having a pinion 104 meshing with a gear 105 supported in a bracket bearing 106, the gear 105 being intermittently rotated in one direction by means of a ratchet wheel 107 and a pawl 108 pivotally connected to a rock arm 109, in turn pivoted on the stud shaft supporting the roller 105, the arm 109 being rocked by a link 110 passing through a slot 111 in the table 1, and pivotally connected to a block 112 adjustably mounted in a radial slot 113 in a crank disk 114 fast to a short horizontal shaft 115 supported in a bracket beneath the table 1, said crank disk 114 being driven from the auxiliary cam shaft 46 by a segment gear 116 on said cam shaft meshing with a segment pinion 117 on the horizontal shaft 115, said gear and pinion being provided with proper starting teeth. The proportions and the relative number of teeth of the gear 116 and the pinion 117 are such as to cause the pawl 108 to rotate the feed roller 102 an amount sufficient to feed or advance the body-web the proper predetermined distance equal, in the present instance, to the length of the shell to be formed. The upper feed roller 101 is carried by a shaft 118 having a pinion 119 meshing with a pinion 120 of equal size, on the shaft carrying pinion 104. In this manner the upper roller 101 will be rotated at the same speed as the lower roller 102. The shaft 118 loosely bears in the bracket 106 so as to permit the roller 101 to have some movement toward and from the roller 102, and the roller 101 is pressed toward the roller 102 by a spring 121 surrounding a pin 122 upstanding from a block 123 in which the shaft 118 bears. The gear 116 and the pinion 117 are locked in positions of rest by the usual intervening smooth peripheral portions of said respective gears.

To positively limit the advance or feed of the body-web and thereby accurately position the advance edge of the body-blank to be severed from said web, stops are disposed in the path of said web. The numeral 124 indicates a vertically reciprocatory body-blank supporting carriage which also serves as one element of the web severing or cutting mechanism, the rear edge 125 of said carrier being squared off to form a cutting edge, or knife, transversely of the web. At the end of the reciprocatory carriage 124 are disposed web stops and web holding devices comprising vertically reciprocatory plates 126 in the path of the web having flanges 127, said flanges providing gripper jaws adapted to coöperate with the upper surface of the carriage 124 to hold the web during the cutting operation and to retain the body-blank on the carriage during certain subsequent operations. These jaws are simultaneously raised or lifted from the upper surface of the carriage 124 by rock levers 128 and 129 fulcrumed on an outer face of the carriage 124, one of the arms of each of said rock levers being rounded as at 130 and disposed to have a sliding or cam engagement with the lower ends of the plates 126. The operating mechanism of the levers 128 and 129 comprises a link 131 whereby the motion of one lever is duplicated by the other, and the lever 129 has an arm 132 joined by a connecting rod 133 to a rock lever 134 pivoted on the frame and carrying a cam roller 135 coöperating with a cam 136 on the auxiliary cam shaft 36. The plates 126 are positively raised by the cam operating mechanism and are lowered by gravity assisted by the spring 137 coiled around a pin 138, the opposite end of said spring engaging pins 139 on plates 126.

Upstanding from the table 1 is a frame piece or block 140 which is horizontally slotted as at 141 to permit the passage of the body-web, and the dimension of this slot widthwise of the web may correspond exactly to the width of the web and hence serve as a guide for said web. On a shoulder 142 of the piece 140 is disposed a relatively stationary cutting blade or knife 143, having slots 144 through which pass cap screws 145. Adjusting pins 146 extend through an upwardly extending flange 147 of the piece 140 and are adapted to abut the side wall of the knife 143. By this construction the knife 143 may be nicely adjusted into position at right angles to the side edges of the web and relatively with the cutting edge 125 comprised in the movable piece 140. The body-blank carriage 124 is supported at the upper end of a substantially depending stem or tubular rod 148 extending through a guide opening in the table 1 and vertically moved through the instrumentality of a bell crank lever 149, one arm of which has a pin and slot engagement with the stem 148 and the other arm of which is pivotally connected to an adjustable rod 150 having a follower comprising a cam roller 151 coöperating with a peripheral cam 152 on the auxiliary cam shaft 36. A spring 153 connects the stem 148 and the frame and assists in lowering said frame.

A device is provided for supporting the body-blanks severed from the body-web and carrying said body-blanks into position relative to the adhesive transfer roller 52' for the purpose of applying glue to said blanks and then carrying the glued blanks into position relative to the cover-blank magazine for the purpose of having cover-blanks from the magazine affixed to the glued face of the respective body-blanks and then carrying the assembled body-blanks and cover-blanks into position relative to certain devices which operate to fold portions of the cover-blanks on the body-blanks and remove the assembled blanks, which may be termed a "composite blank," from the carrier. This device comprises a hub 154 mounted to rotate with the shaft 22, said hub having in the present embodiment four radially extending arms 155 terminating in axially extending blank supporting flat carrier faces 156 overhanging the hub, each of said faces 156 comprising a pneumatic gripper, as by means of openings or slots 157 therein, communicating with air passageways 158 in the respective radial arms 155, which latter passageways in turn communicate with respective air passageways 159 in the hub 154, the passageways 159 terminating in the front face of said hub, as illustrated at 160 in Fig. 8, and being adapted to communicate with the face of an oscillatory plate, or valve, 161 journaled on the shaft 22 and having an air opening 162 communicating by means of a flexible pipe 163 with the air pipe 9 leading to the chamber 6. The opening 162 is also adapted to communicate with a concentric segmental channel 164 in the face of the plate 161, this channel being adapted to register at times with the opening 160. The plate 161 is oscillated from the reciprocatory carrier 124 by means of a link 165 pivoted to said reciprocatory carrier and having a loose connection with the plate 161, as by means of a pin 166 on the plate 161, and a slot 167 in the link 165.

The face of each blank carrier is the same in shape as the body-blank, in the present instance rectangular, and on three sides of each face is provided a gluing device, or dauber, consisting of an open three-sided rectangular frame 168 preferably having brass faces, the faces of which frame, when the body-blank is on the carrier and while glue is being applied to said blank, is in a plane flush with the outer face of the body-blank. These daubers have each a reciprocatory or oscillating movement radially so as to alternately dispose the outer faces thereof in planes flush with the outer faces of the body-blanks and also radially spaced inwardly therefrom toward the axis of the carrier. To accomplish these movements these frames 168 are respectively mounted upon plates 169 guided for radial movement in the arms 155, each plate 169 having a follower, as an anti-friction roller 170. A segmental guiding trackway or cam 171 is fixed to the frame of the machine and as the arms 155 rotate, thereby translating the carriers 156 in an endless path, the rollers 170 contact with the inner face of the track 171, the rollers first contacting with said track at the end indicated by the numeral 172 and at that time being moved inwardly by a cam portion 173 of the track. This inner movement is sufficient to space the frame 168 away from the plane of the assembled blanks so as to permit certain cover-blank folding members or jaws to enter between the rear face of said blank and the outer face of said frame 168. Immediately succeeding the cam portion 173 is a concentric portion 174 which retains the frame 168 in its inner position when the carrier plates are opposite the reciprocatory carriage 124, and the concentricity is preserved until just before the carrier arrives in position where glue is transferred from the reservoir to the body-blank on the carrier, whereupon the rollers 170 move radially outward on an inclined face 175, this latter movement being sufficient to dispose the outer face of the dauber 168 flush with the outer face of the body-blank which was placed on the carrier plate when opposite the reciprocatory carriage 124. As an efficient means for maintaining the frames 168 in outer flush position and permit them to move inwardly under the influence of the cam 171, each frame 168 comprises a yoke 176 which loosely engages a pin 177 tapped into the web of the arms 155, an expansible spring 178 surrounding this pin and acting to press the yokes, and in consequence the frames 168, radially outward. The outermost position of the frame 168 may be nicely determined by means of an adjusting screw 179 threaded into the yoke 176 and adapted to abut the web of the arm 155. It will be understood that the construction of each carrier arm 155 and the carrier plates, frames, etc., are similar, so that a description of one will suffice for all. It may be noted at this point that the body-blanks are of such a size as to provide practically the exact dimensions of the shell when folded into a shell, but that the cover-blanks are to be folded over the opposite sides of the body-blank so that the shell shall present a nice appearance at its ends. Furthermore, the opposite sides and one end of the cover-blank extend beyond the opposite sides and an end of the body-blank when adhesively assembled therewith on the carrier, and said end is adapted to be folded across the joint formed by folding the body-blank and abutting its opposite ends, and serves to secure the opposite ends of the blanks together in shell form. The front and rear sides of the dauber 168 are disposed opposite those portions of the cover-blank which extend beyond the body-blank when assembled therewith on the carrier, and the end 180 of the dauber 168 is disposed opposite the extending end of the cover-blank when in assembled relationship with the blank on the carrier. From this it will be clear that the dauber 168 has its parts disposed in such position that when the cover-blanks are applied to the body-blank on the faces 156, two sides and an end of said cover-blanks will contact the dauber 168 and in this manner the cover-blanks will have glue applied thereto on two sides and an end adjacent said sides of the body-blank.

On the table 1, at the left hand side, looking at Fig. 3, is an upstanding bracket 181, providing an elongated guide, or horizontal channel bearing 182, in which are mounted two superposed supports, or slides, 183 and 184, these being retained in the guide by a plate 185, the slides 183 and 184 being adapted to move toward and from a station of rest of the intermittently rotating carriers 156. At one end the lower slide 184 carries a blank supporting and pressing head 186, which is adapted to be placed in contact with the outer face of the composite blank on the carrier with the opposite sides of the head 186 practically in transverse alinement with the opposite sides of the body-blank. The upper slide 183 has a transverse piece 187 through an opening in which the lower slide passes, and it also has a lateral extension 188 on which a rock-lever 189 is pivoted. The opposite ends of the lever 189 are respectively connected by links 190 to the ends of two levers pivoted on the piece 187, said levers having angularly disposed folding fingers 191. The slides 183 and 184, and the head 186, and the fingers 191 are translatable toward and from the carrier, and the fingers 191 are relatively movable toward and from each other. Furthermore the fingers 191 are translatable relative to the head 186 in a direction normal to said head and transversely of the translatory movement of said head. Advantage is taken of these possible movements to cause the fingers 191 to fold the extending sides of the cover-blank across the edges of the body-blank and against the opposite face of the body-blank; to cause the interfolded parts to be pressed, or squeezed, between fingers 191 and head 186, and to cause the assembled composite blank to be removed from the former and disposed in position to be grasped by another device for further operating on the composite blank. The rock-lever 189 is operated through a connecting rod 192, a rock-lever 193, fulcrumed on support 194, and a cam 195 on the shaft 34, a roller 196 on the lever 193 coöperating with said cam, this mechanism in connection with a spring 197, serving to cause the fingers 191 to approach or recede from each other, and to be retained in approached or separated position at times. The upper slide 183 is connected by an adjustable link 198 to an upstanding rock arm 199 having a roller 200 coöperating with a cam 201 on the main cam shaft 34, and the lower slide 184 is connected to the upper end of the rock arm 199 by links 202 and 203 providing a toggle, the knee of the toggle being in turn pivotally connected to a follower 204 comprising a roller 205 adapted to coöperate with a cam 206 on the main cam shaft 34. The cam 201 operates to positively translate the rod 183 in a direction away from the intermittently rotating carrier, movement toward said carrier being effected by a spring 207. The cam 206 operates to positively translate the head 186 in a direction toward the carrier, and a spring 208 acts to move the head 186 in a direction away from the carrier and this movement may be a movement relative to the head 187.

The numeral 209 indicates an upstanding bearing bracket having at its top a channel comprising undercut sides in which is guided a slidable carriage 210 which is adapted to move transversely of the plane of movement of the body-blank carrier, and preferably at a slight angle to the plane of the blank in grasp of the fingers 191. One end of the carriage provides a gripper jaw 211, and a coöperative gripper jaw 212 is pivoted on the carriage and urged toward the jaw 211 by a spring 213 interposed between the carriage 210 and a detail of the jaw 212. A bell crank lever 214 is pivoted to the carriage, one arm of this lever being disposed to engage the tail of the pivoted gripper jaw 212 and the other arm 215 extending in a position to coöperate with the device to positively turn the bell crank in a direction to cause the pivoted jaw 212 to approach the jaw 211. The gripping face of the jaw 211 is preferably disposed at an angle to the plane of movement of the gripper carriage 210, this angle being such that when these jaws close on a blank held by the jaws 191 they do not bend said blank but permit the same to be retained in original plane condition between the jaws 191. To the carriage 210 is fastened a bracket 216, and rotatably mounted in the bracket is a bushing 217, which latter is prevented from longitudinal movement relative to the carriage by its flanged head 218 and a collar 219 fastened to the bushing. The bushing has a squared longitudinal opening through which passes a squared shaft 220, the end of said shaft being disposed opposite the arm 215 of the bell crank lever 214, and a screw-threaded portion 221 of the shaft 220 engages a counter-part threaded bearing, or sleeve, in a bracket or block 222 fixed to the carriage 210.

The purpose of the transferring gripper involving the jaws 211, 212, is to remove the label or cover-blank from the fingers 191 and transfer them to a former on which they are subsequently folded into shells or tubes, and said gripper is first moved into gripping position, then the jaws are closed on the blank and then the gripper retreats and carries the blank into a position intersecting the path of rotation of the formers, hereinafter referred to. The gripper carriage is moved back and forth and is operated to perform these functions by mechanism as follows: A vertical bearing sleeve 223 is provided in a bracket 224 fixed to the table 1, and a shaft 225 is rotatably mounted in the sleeve 223, the upper end of said shaft having an arm 226 connected with the gripper carriage 210 by a link 227 pivotally engaging an ear on the bearing bracket 222. A spring 228 is coiled around the vertical shaft, one end being anchored to the bracket 224 as at 229 and the other end being fixed to the vertical shaft by engaging one of a series of openings 230 on said shaft, a plurality of said openings being provided in order that the tension of the spring may be adjusted. The spring 228 is disposed to urge the carriage 210 toward the folding jaws 191, and the carriage is urged in the opposite direction by a cam 231 engaging a roller 232 on a follower 233, pivotally connected to a yoke 234, said yoke being in turn pivotally connected to a lower arm 235 of the vertical shaft 225. An additional spring 236 connecting the yoke 234 and the bracket 209 serves to assist in the advancing movement of the gripper carriage. Fixed to the bushing 217 is an arm 237 which is pivotally connected to a rod 238, in turn pivotally connected to a rock-lever 239 having a roller 240 coöperating with a cam 241 on the main cam shaft 34, which cam serves to positively rotate the bushing 217, and in consequence, rock the squared shaft 220, and thereby cause the longitudinal movement of the squared shaft relative to the carriage in a direction to positively move the gripper jaw 212 away from its companion jaw 211. A spring 242 is connected to a pin 243 on the bracket 209 and to the end of rock-lever 239 and keeps the roller 240 in contact with the cam 241, serving to close the gripper jaws 211 and 212 when the cam permits.

At the front of the machine the shaft 33 bears in the upstanding bracket 209 and a series of formers or mandrels is mounted to rotate with said shaft. Fastened to the shaft 33 is a hub or block 250 carrying four mandrels or formers 251 in the nature of arms radially extending from the hub 250, said arms having unobstructed, or free, outer ends. Through each arm extend two independent radial passageways, or chambers, 252 and 253, these passageways being separated from each other in the arm and opening into the respective adjacent front and rear faces of the arm by means of a series of openings 254. The passageways 252 and 253 extend through the hub 250 and open into the front face of said hub at 255, the front openings being adapted to register at times with a channel 256 in an oscillatory valve, or plate, 257 closely abutting the front face of the hub and adapted to be oscillated through the instrumentality of a connecting rod 258, a rock-lever 259 and a cam 260 on the main cam shaft, said lever 259 having the customary roller for engaging the cam 260, a spring 261 being employed to effect movement of the plate 257 in one direction. The formers 251 are driven synchronously with the intermittently moving blank carriers and said formers are so disposed that one of them when in vertical position is horizontally opposite the folding fingers 191. The gripper carriage 210 takes the composite blank from the folding grippers and places the same in the path of the formers directly opposite the perforated advancing face of the uppermost former, and with one of the divisions of the blank, in the present instance the smaller inner division, opposite said face. The blank having been placed as just stated the advancing face of the former is energized to cause the blank to pneumatically adhere to the advancing face of the former, whereupon the transfer gripper releases the blank and retreats a slight distance so as to dispose the grippers 211 and 212 out of the subsequent rotary path of the blank. The piece or plate 257 has a passageway communicating with the passageway 256 and, by means of a flexible pipe 263, with the air pipe 8 leading to the vacuum pump 5.

The flat composite blank consisting of the body-blank and the adhering cover-blank having been pneumatically gripped to the former or mandrel as explained, is to be folded therearound and its opposite ends secured to form a shell. Extending transversely of the main cam shaft is a short horizontal oscillatory shaft 264, having fixed thereto an upstanding arm 265 having a dove-tailed vertically disposed slot in which is mounted a supporting plate 266 having a pin 267 connected by a spring 268 to a pin 269 on the arm 265, said spring being adapted to yieldingly hold the support 266 from upward movement relative to said arm 265. The position of said support 266 relative to the arm 265 may be adjusted by means of a screw 270 threaded into the support 266 and abutting the upper end of the arm 265. The support 266 carries devices which operate to fold the composite blank around the former, these devices comprising two fingers or horns 271 which are disposed to contact the outer opposite portions of the blank as the former moves the blank to and between these horns, and further comprises two rollers 272 between which the former carries the partially folded blank, which rollers further fold the blank against the opposite sides of the former and may also press the folded portion against said sides, as the former moves therebetween. The mandrel or former comes to rest with its rear or trailing face on a level with or slightly above the lower element of the cylindrical surface of the rollers 272, whereupon the shaft 264 is oscillated, first in one direction to fold one end of the body-blank onto the trailing face of the mandrel, and dispose the end edge in close proximity to the opposite end of the edge of the blank, and then in the opposite direction to fold and wipe the projecting end of the cover or label across the joint in the body-blank and down onto the end portion of the body-blank or directly onto the end of the attached cover-blank, if the latter occurs at this part. The oscillatory movement of the rollers 272 is effected through the oscillation of the arm 265 and the shaft 264, which latter has an arm 273 connected by a rod 274 to a lever 275 pivoted on a bracket 276, and having a roller 277 coöperating with a cam 278 on the main cam shaft 34. The cam positively effects movement of the roller 272 in one direction, movement in the opposite direction being effected by a spring 279. Preferably the lower element of the rollers 272 is slightly below the trailing face of the mandrel opposite thereto, so that when the rollers are oscillated to fold the end of the body-blank and the extended end of the cover or label they exert some pressure upon the folded portions, the spring 268 permitting a slight rise of these rollers and causing said pressure. In order that the blanks shall be held in folded condition closely adjacent the former just before and during the folding operations of the rollers 272, relatively stiff upright keepers, or spring plates, 280 are provided, one on each side of the former, said plates having outwardly flaring upper end portions to ease the former and the folded blank therebetween.

After being folded, as just described, the former moves to another, its lowermost position, where the shell formed may be inspected if desired, and then it moves to a next succeeding horizontal position, the same being a convenient position for stripping the shell from the mandrel and assembling the shell with a tray, as hereinafter described.

The numeral 281 indicates a bracket, the upper portion of which provides a horizontal dove-tailed channel 282 below the shaft 33 and at one side of the path of the formers or mandrels. Connected to reciprocate in the channel 282 is a plate 283 having attached thereto a shell stripper comprising a rod or plate 284 which is adapted to lie against the rear face of the mandrels when in horizontal position after the shells have been formed thereon. The plate 284 is moved at proper times in a direction to engage the edge of a shell on the former and remove, push, or strip the same from the former, the shells passing over the outer or free ends of the formers. The plate 283 is connected by a rod 285 to a rock arm 286 pivoted at 287 and oscillated through the instrumentality of a cam 288 on the main cam shaft 34, and a follower 289 having a roller 290 adapted to coöperate with the cam 288. The cam 288 operates to positively move the stripper in a direction to slide the shells off the former, movement in the opposite direction being effected by a spring 291.

The numeral 300 indicates a hopper or container for a supply of trays, which in the present instance are prismatic open boxes of a size to fit into the shells formed by the mechanism previously described. The opening 301 from this chute is disposed in convenient position for an operator sitting alongside the machine to place the trays on edge on a belt conveyer 302, said belt running over the bottom 303 of a trough comprising upstanding walls 304 adapted to guide the boxes successively as they are fed by the belt. The belt 302 is driven by a belt pulley 305 on a shaft 306 and is coupled by a belt 307 with a pulley 308 onto the main cam shaft 34, so that the operation of the cam shaft will result in a continuous travel of the belt 302. The boxes are yieldingly pressed downwardly into the trough adjacent the assembly point by means of a roller weight 309 supported by a pivoted arm 310. The belt 302 passes beneath upstanding guide walls 311 of a supporting guideway extending transversely of the direction of the feed of the boxes by the belt 302, and as the boxes assume position opposite the opening to this transverse guideway a reciprocatory pusher 312 is operated to advance the boxes one by one into the transverse guideway, each box pushing the one ahead of it and eventually the foremost box arrives in position opposite an opening 313 directly opposite the end of the former when the former is in stripping position, and in alinement with the longitudinal extent of said former, so that when the shell is stripped or pushed from the mandrel by the stripper 284 said shell will pass over or telescope with the tray in position opposite an opening 313, said shell and tray being in this manner assembled. The pusher 312 comprises a plate which extends forwardly from a reciprocatory slide 314, and also comprises a lateral stop portion 315 which is adapted to prevent the adjacent box on the belt 302 from being fed during the feeding of a preceding box into the transverse guideway. Feeding operation of the slide 314 is effected through a connecting rod 316 pivoted to an arm 317 of a rock shaft 318, having another arm 319 connected to a follower 320 and having a roller 321 coöperating with a cam 322 on the auxiliary rock shaft 36. The slide 314 is positively moved by the cam 322 in a direction to feed the boxes, a spring 323 serving to return the slide to initial feeding position.

Overhanging the conveyer trough is a device adapted to prevent the boxes falling over as they arrive opposite to and while in the transverse trough or guideway. This device comprises a plate 324 slightly upturned at either end and extending over the conveyer trough and over the transverse trough at the position opposite the opening 313. The plate or wall 324 is pivoted to the sides of the transverse trough at 325 and is connected to a bottom plate or wall 326 also pivotally connected to the sides of the transverse trough as at 327, the plate 326 forming the bottom of the transverse trough and supporting the trays in their passage from the conveyer trough to assembly position opposite the opening 313. Springs 328 connect the plates 324 and 326 at the further end and cause them to grip the trays, while springs 329 are connected to the uppermost plate 324 and to the frame to definitely position the uppermost plate relative to the opening 313 and thereby position the trays in predetermined position relative thereto. A spring detent finger 330 extends in advance of the plate 324 and serves to limit the advance of the trays into the transverse trough. A shell having been stripped from the former will be pushed by the stripper through the opening 313 and will telescopically engage the box in position opposite said opening. The next feed of trays by the pusher 312 will advance the assembled tray and shell, the resilient stop 330 giving way to permit this advance, whereupon the assembled elements will drop through the chute 331 into position opposite a receiving trough 332 and in front of an ejector or pusher 333 mounted on a reciprocatory slide 334 having pin and slot engagement with one arm of a bell crank lever 335, the other arm of said lever being connected by a rod 336 to the rock arm 286. Movement of the pusher or ejector 333 toward the trough 332 will push the assembled boxes and trays into the latter trough, and past a spring detent 337 which latter will prevent retrograde movement of the assembled elements.

The operation of this machine should be largely obvious from the preceding, but a summary thereof will now be given. The motor 4 is started and the valves 10 and 11 are opened. A roll of body-web is mounted to rotate on the brackets 93, and the web is threaded through the tension device 98 over the guide-roller 99, beneath the keeper roller 100, between the intermittently rotating web feeding rollers 101 and 102 and beneath the stationary knife 143 onto the carriage 124. The tank 44 is provided with a supply of liquid adhesive such as glue, and a pack of cover-blanks is placed in the cover-blank magazine, such blanks having been cut to proper shape and size, as for instance exemplified in the cover-blank a, shown in Fig. 27. The body-web being in position on the carriage 124, the jaws 127 will be moved to grip the end of the body-web, and then the carriage 124 will rise and the web will be severed by the stationary knife 143 coöperating with the cutting edge 125 of the carriage 124, thus producing a body-blank b of the proper size and shape to be assembled with a cover-blank from the magazine. Continued upward movement of the carriage 124 will result in the application of the body-blank to the face of that carrier which is in lowermost position, and immediately or just before the contact of the body-blank with said carrier the valve 161 will have been moved so that the passageway 164 registers with the opening 160 communicating with the face of said carrier, so that when the body-blank is applied to the said carrier it will be pneumatically gripped thereto. In this lowermost position of said carrier the dauber 168 will be spaced inwardly from the pneumatic face of the carrier, thus permitting the grippers 127 to pass beyond the outer plane of said carrier face. The carrier with the body-blank thereon is then moved in the direction indicated by the arrow in Fig. 3, and through an angle, preferably of ninety degrees, whereupon it rests, and operations are performed upon other cariers at other stations. Immediately thereafter said carrier carrying said body-blank is moved or translated a further angle of ninety degrees and comes to rest opposite the cover-blank magazine. When moving from the second or right hand position of rest in Fig. 3, to the upper position opposite the label magazine, the outer face of the body-blank is coated with adhesive by the roller 52 which is moved so as to contact with the advancing side of the body-blank and roll over the face of said body-blank as the body-blank is moved past said roller. When said carrier assumes said second mentioned position of rest the spring 178 has moved the dauber into position flush with the outer face of the body-blank, this movement being permitted by reason of the inclined face 175 of the fixed cam 171. The roller 52 is of sufficient length to not only contact with the body-blank in order to apply adhesive thereto, but also to contact with each side and the end of the dauber 168 and apply adhesive to said dauber simultaneously with its application to the body-blank. When said carrier and the adhesive coated body-blank and dauber are in position opposite the cover-blank magazine, said magazine is moved downwardly and the lowermost blank is thereby pressed or applied on the adhesive coated face of the body-blank, but the cover-blank is of such dimension that its sides and one end will extend beyond the respective opposite sides and one end of the body-blank and be in position opposite the sides and end of the dauber 168, so that the intermediate portion of the cover-blank is applied to the body-blank, while the extended sides and end of the cover-blank are applied onto the adhesive coated faces of the dauber. The lowermost cover-blank of the magazine will therefore adhere to the body-blank and to the dauber, the dauber thus serving to coat the extended sides and end of the cover-blank with adhesive. The carrier with the composite blank, or adhering blanks, is then moved a further angle of ninety degrees and comes to rest opposite the device which coöperates to fold the extended sides of the cover-blank onto and around the sides or edges of the body-blank and to move or convey the adhesively assembled blanks from the carrier. The composite blank having come to rest in the left hand position, as illustrated in Fig. 3, the slides 183 and 184 are translated toward the carrier transversely of the blank supporting face thereof and the fingers 191 fold the extended sides of the cover-blank across the opposite edges of the body-blank, the head 186 being pressed against the inner portion of the composite blank and serving to hold the same firmly while the fingers 191 are relatively moved toward each other to fold the remaining portion of said extended sides down onto the opposite face of the body-blank. After this the fingers 191 are translated in a direction away from the face of the carrier and normal to the face of the head 186, thereby squeezing the inner folded portions of said blank. Immediately upon the completion of said squeezing action and while the fingers 191 are in their "approached" position, the slides 183 and 184 are translated away from the carrier thus removing the composite blank from the carrier, the pneumatic gripper having been deënergized just prior to the stripping of the composite blank from said carrier.

The composite blank will then be held between the fingers 191 and the head 186 and in position to be grasped by the transferring grippers 211 and 212 of the transversely operating gripper-carriage which will advance and grasp the composite blank while the latter is held by the fingers 191. Retrograde movement of the gripper-carriage will convey the composite blank into the path of one of the formers or mandrels and preferably an intermediate section of said blank will come directly opposite the advancing face of a predetermined one of said formers and the advancing pneumatic gripping face of said former will be energized to grip the composite blank to said former before the transferring gripper jaws release said blank. After said gripping on the former the transferring grippers release their hold upon the composite blank and retreat so as to clear said composite blank, and the composite blank will be held on the former with the opposite ends thereof extending on opposite sides of said former. Said former is now rotated and the outer portions of the composite blank will contact with the horns 271 which latter will partially fold the composite blank on the former, further folding being accomplished by the rollers 272 when in stationary position, between which rollers the former carries said composite blank, said rollers serving to fold the inner portions of the composite blank closely against the opposite lateral faces of the former. Completion of the intermittent movement of said former whereby said folding of the composite blank is effected, will bring the trailing face of the former horizontally in line with or slightly above the lowest element of the cylindrical surface of the rollers 272, whereupon the oscillation of said rollers in opposite directions transversely of the path of the former will serve, first, to fold that end of the composite blank involving both the body-blank and the cover-blank down onto the former, against which it will be held pneumatically, the trailing gripper face of the former having then been energized, and second, to fold the extending end of the cover-blank down onto the last folded part and to press said folded parts together. While the former is in its position of rest adjacent the folding rollers 272 the keepers 280 retain the intermediate folded parts of the composite blank closely against the opposite faces of the former. The former is then rotated through an idle station of rest and then to a horizontal station of rest at which latter the stripper 284 operates to push the folded composite blank, which may now be termed a shell or tube, off of the free end of said former. In Fig. 28 the numeral 350 indicates the shell or tube, and 351 indicates a tray. Trays from the hopper 300 will have been placed in proper position upon the carrier belt 302 by an attendant and by the mechanism described will have been advanced one by one into position opposite the opening 313, which opening is located in alinement with the stripping position of said former. The resiliently supported bottom and top walls 324 and 326 together with the resilient stop 330 will serve to arrest the foremost tray in position opposite the opening 313 and in alinement with the former when in stripping position, so that when the stripper 284 pushes a shell from the former said shell will be pushed over or into telescopic relation with the foremost tray, said tray and shell being thus assembled. Subsequently in advancing, the pusher 312 will force the assembled tray and shell past the yielding stop 330, and said assembled elements will drop through the chute 331 onto the bottom of the receiver magazine 332 from which latter position successively assembled shells and trays will be pushed along and into the receiver by the ejector 333, the resilient check 337 serving to prevent retrograde movement of said assembled shells and trays.

In the above description the terms "body-blank" and "cover-blank" have been employed for the purpose of distinguishing between two blanks on account of the different operations performed upon or with said blanks. It is to be understood that the cover-blank might be of the same character as the body-blank and vice versa without departing from the spirit of this invention. It will be observed that when the formers are in position to receive blanks from the carrier faces 156, the front openings 254 communicate with the channel 256 in the oscillatory plate 257, whereas at this time the rear openings 254 in the trailing face of the former do not, waste of energy being avoided in the latter instance. Communication is established with the latter openings, however, just prior to or while the former is at the folding station, the passageway leading to the trailing face of said former being in communication with the channel 256 in the valve or plate 257.

By the foregoing described construction is provided a machine which efficiently accomplishes, among others, all the objects heretofore referred to.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense. It is also to be understood that the language used in the following claims is intended to cover all of the generic and specific features of the invention herein described and all statements of the scope of the invention, which, as a matter of language, might be said to fall therebetween.

Having described our invention, what we claim as new and desire to secure by Letters Patent is:

1. In an apparatus of the character described, in combination, means adapted to assemble a body-blank and a cover-blank with the opposite sides of the cover-blank extending beyond opposite edges of the body-blank, and with one end of the cover-blank extending beyond an end of the body-blank, means adapted to fold the extended sides over the edges of the body-blank adjacent thereto and adhesively secure the same thereto, means adapted to fold the assembled blanks into a shell, and means adapted to fold the extended end of the cover-blank onto the opposite end of the cover-blank and adhesively secure the same.

2. In an apparatus of the character described, in combination, means adapted to assemble a body-blank and a cover-blank, with opposite sides of the cover-blank extending beyond opposite edges of the body-blank, and with one end of the cover-blank extending beyond an end of the body-blank, means adapted to fold the extended sides of the cover-blank over the edges of the body-blank adjacent thereto and adhesively secure the same thereto, means adapted to fold the assembled blanks into a shell, and means adapted to fold the extended end of the cover-blank across the joint between the ends of the body-blank and adhesively secure the folded portion.

3. In an apparatus of the character described, in combination, means adapted to assemble a body-blank and a cover-blank, means adapted to fold the assembled blanks into a shell, and means adapted to assemble the shell with a tray.

4. In an apparatus of the character described, in combination, means adapted to assemble a body-blank and a cover-blank, means adapted to fold the assembled blanks into a shell, and means adapted to move the shell into telescopic relation with the tray to assemble said shell and tray.

5. In an apparatus of the character described, in combination, a translatable carrier adapted to support a body-blank, a translatable former, means adapted to cooperate with said carrier to adhesively assemble thereon a body-blank and a cover-blank in superposed relation with the side of the cover-blank extending beyond the side of the body-blank, means adapted to fold the extended side of the cover-blank around the side of the other blank, means adapted to transfer the composite blank to said former, and means adapted to fold the composite blank around said former.

6. In an apparatus of the character described, in combination, a translatable carrier adapted to support a body-blank, a translatable former, means adapted to cooperate with said carrier to adhesively assemble thereon a body-blank and a cover-blank in superposed relation with the side of the cover-blank extending beyond the side of the body-blank comprising a dauber translatable with said carrier and adapted to contact with the extended side of said cover-blank, means adapted to fold the extended side of the cover-blank around the side of the other blank, means adapted to transfer the composite blank to said former, and means adapted to fold the composite blank around said former.

7. In an apparatus of the character described, in combination, a translatable carrier adapted to support a body-blank, a translatable former, means adapted to cooperate with said carrier to adhesively assemble thereon a body-blank and a cover-blank in superposed relation with the side of the cover-blank extending beyond the side of the body-blank comprising a dauber translatable with said carrier and movable transversely of the supporting face of said carrier, means adapted to fold the extended side of the cover-blank around the side of the other blank, means adapted to transfer the composite blank to said former, and means adapted to fold the composite blank around said former.

8. In an apparatus of the character described, in combination, a translatable carrier adapted to support a body-blank, a translatable former, means adapted to cooperate with said carrier to adhesively assemble thereon a body-blank and a cover-blank in superposed relation with the side of the cover-blank extending beyond the side of the body-blank comprising a dauber translatable with said carrier and movable transversely of the supporting face of said carrier to and from a plane flush with the outer face of the body-blank, means adapted to fold the extended side of the cover-blank around the side of the other blank, means adapted to transfer the composite blank to said former, and means adapted to fold the composite blank around said former.

9. In an apparatus of the character described, in combination, a translatable carrier adapted to support a body-blank, a translatable former, means adapted to cooperate with said carrier to adhesively assemble thereon a body-blank and a cover-blank in superposed relation with the side of the cover-blank extending beyond the side of the body-blank comprising a dauber translatable with said carrier and movable inwardly transversely of the supporting face of said carrier to and from a plane flush with the outer face of the body-blank, means adapted to fold the extended side of the cover-blank around the side of the other blank, means adapted to transfer the composite blank to said former, and means adapted to fold the composite blank around said former.

10. In an apparatus of the character described, in combination, a translatable carrier adapted to support a body-blank, a translatable former, means adapted to cooperate with said carrier to adhesively assemble thereon a body-blank and a cover-blank in superposed relation with the side of the cover-blank extending beyond the side of the body-blank comprising a dauber translatable with said carrier and oscillatable transversely of the supporting face of said carrier, means comprising a fixed cam adapted to coöperate to effect the oscillation of said dauber, means adapted to fold the extended side of the cover-blank around the side of the other blank, means adapted to transfer the composite blank to said former, and means adapted to fold the composite blank around said former.

11. In an apparatus of the character described, in combination, a translatable carrier adapted to support a body-blank, a translatable former, means adapted to coöperate with said carrier to adhesively assemble thereon a body-blank and a cover-blank in superposed relation with the side of the cover-blank extending beyond the side of the body-blank comprising means adapted to feed a body-blank to said carrier, means adapted to fold the extended side of the cover-blank around the side of the other blank, means adapted to transfer the composite blank to said former, and means adapted to fold the composite blank around said former.

12. In an apparatus of the character described, in combination, a translatable carrier adapted to support a body-blank, a translatable former, means adapted to coöperate with said carrier to adhesively assemble thereon a body-blank and a cover-blank in superposed relation with the side of the cover-blank extending beyond the side of the body-blank comprising a body-blank supporting carriage, means adapted to move said carriage toward and from said carrier, a pneumatic gripper adapted to cause a body-blank from said carriage to be attached to said carrier, means adapted to fold the extended side of the cover-blank around the side of the other blank, means adapted to transfer the composite blank to said former, and means adapted to fold the composite blank around said former.

13. In an apparatus of the character described, in combination, a translatable carrier adapted to support a body-blank, a translatable former, means adapted to coöperate with said carrier to adhesively assemble thereon a body-blank and a cover-blank in superposed relation with the side of the cover-blank extending beyond the side of the body-blank comprising a carriage, means adapted to move said carriage toward and from said carrier, means adapted to feed a body-web onto said carriage, a knife adapted to coöperate with said carriage to sever a body-blank from said web on the movement of said carriage toward said carrier, means adapted to fold the extended side of the cover-blank around the side of the other blank, means adapted to transfer the composite blank to said former, and means adapted to fold the composite blank around said former.

14. In an apparatus of the character described, in combination, a translatable carrier adapted to support a body-blank, a translatable former, means adapted to coöperate with said carrier to adhesively assemble thereon a body-blank and a cover-blank in superposed relation with the side of the cover-blank extending beyond the side of the body-blank comprising a carriage, means adapted to move said carriage toward and from said carrier, means adapted to feed a body-web onto said carriage, a knife adapted to coöperate with said carriage to sever a body-blank from said web on the movement of said carriage toward said carrier, a body-blank gripper jaw movable with said carriage, means adapted to fold the extended side of the cover-blank around the side of the other blank, means adapted to transfer the composite blank to said former, and means adapted to fold the composite blank around said former.

15. In an apparatus of the character described, in combination, a translatable carrier adapted to support a body-blank, a translatable former, means adapted to coöperate with said carrier to adhesively assemble thereon a body-blank and a cover-blank in superposed relation with the side of the cover-blank extending beyond the side of the body-blank comprising a body-blank supporting carriage, means adapted to move said carriage, toward and from said carrier, a pneumatic gripper adapted to cause a body-blank from said carriage to be attached to said carrier, means operable by the movement of said carriage adapted to energize said pneumatic gripper, means adapted to fold the extended side of the cover-blank around the side of the other blank, means adapted to transfer the composite blank to said former, and means adapted to fold the composite blank around said former.

16. In an apparatus of the character described, in combination, a translatable carrier adapted to support a body-blank, a translatable former, means adapted to coöperate with said carrier to adhesively assemble thereon a body-blank and a cover-blank in superposed relation with the side of the cover-blank extending beyond the side of the body-blank comprising a dauber translatable with and movable transversely of the supporting face of said carrier, a body-blank supporting carriage, means adapted to move said carriage toward and from said carrier, means adapted to cause said dauber to be spaced from the supporting face of said carrier when said carriage applies a body-blank to said carrier, means adapted to fold the extended side of the cover-blank around the side of the other blank, means adapted to transfer the composite blank to said former, and means adapted to fold the composite blank around said former.

17. In an apparatus of the character described, in combination, a translatable carrier adapted to support a body-blank, a translatable former, means adapted to coöperate with said carrier to adhesively assemble thereon a body-blank and a cover-blank in superposed relation with the side of the cover-blank extending beyond the side of the body-blank comprising an adhesive-carrier adapted to coat the body-blank on said carrier, means adapted to fold the extended side of the cover-blank around the side of the body-blank, means adapted to transfer the composite blank to said former, and means adapted to fold the composite blank around said former.

18. In an apparatus of the character described, in combination, a translatable carrier adapted to support a body-blank, a translatable former, means adapted to coöperate with said carrier to adhesively assemble thereon a body-blank and a cover-blank in superposed relation with the side of the cover-blank extending beyond the side of the body-blank comprising an adhesive-carrier adapted to coat the body-blank on said carrier while said blank-carrier is moving, means adapted to fold the extended side of the cover-blank around the side of the body-blank, means adapted to transfer the composite blank to said former, and means adapted to fold the composite blank around said former.

19. In an apparatus of the character described, in combination, a translatable carrier adapted to support a body-blank, a translatable former, means adapted to coöperate with said carrier to adhesively assemble thereon a body-blank and a cover-blank in superposed relation with the side of the cover-blank extending beyond the side of the body-blank comprising an adhesive carrying roller adapted to roll on the body-blank on said carrier, means adapted to cause uniform pressure between said roller and the body-blank, means adapted to fold the extended side of the cover-blank around the side of the body-blank, means adapted to transfer the composite blank to said former, and means adapted to fold the composite blank around said former.

20. In an apparatus of the character described, in combination, a translatable carrier adapted to support a body-blank, a translatable former, means adapted to coöperate with said carrier to adhesively assemble thereon a body-blank and a cover-blank in superposed relation with the side of the cover-blank extending beyond the side of the body blank comprising a dauber translatable with and movable transversely of the supporting face of said carrier, an adhesive-carrier adapted to coat said dauber, means adapted to fold the extended side of the cover-blank around the side of the body-blank, means adapted to transfer the composite blank to said former, and means adapted to fold the composite blank around said former.

21. In an apparatus of the character described, in combination, a translatable carrier adapted to support a body-blank, a translatable former, means adapted to coöperate with said carrier to adhesively assemble thereon a body-blank and a cover-blank in superposed relation with the side of the cover-blank extending beyond the side of the body-blank comprising a dauber translatable with and movable transversely of the supporting face of said carrier, an adhesive-carrier adapted to coat said dauber, means adapted to cause said dauber to be in position flush with the outer face of said body-blank while being coated, means adapted to fold the extended side of the cover-blank around the side of the body-blank, means adapted to transfer the composite blank to said former, and means adapted to fold the composite blank around said former.

22. In an apparatus of the character described, in combination, a translatable carrier adapted to support a body-blank, a translatable former, means adapted to coöperate with said carrier to adhesively assemble thereon a body-blank and a cover-blank in superposed relation with the side of the cover-blank extending beyond the side of the body-blank comprising a dauber translatable with and movable transversely of the supporting face of said carrier, means adapted to cause said dauber to be in position flush with the outer face of the body-blank, an adhesive-carrier adapted to simultaneously coat said dauber and the outer face of a body-blank on said blank carrier when said dauber is in said flush position, means adapted to fold the extended side of the cover-blank around the side of the body-blank, means adapted to transfer the composite blank to said former, and means adapted to fold the composite blank around said former.

23. In an apparatus of the character described, in combination, a translatable carrier adapted to support a body-blank, a translatable former, means adapted to feed a body-blank to said carrier, means adapted to feed a cover-blank and adhesively assemble the same in superposed relation with said body-blank on said carrier, with the sides of the cover-blank extending beyond the sides of the body-blank, means adapted to fold the extended side of the cover-blank around the side of the body-blank, means adapted to transfer the composite blank to said former, and means adapted to fold the composite blank around said former.

24. In an apparatus of the character described, in combination, a translatable carrier adapted to support a body-blank, a translatable former, means adapted to feed a body-blank to said carrier, a cover-blank magazine, means adapted to coat the body-blank on the carrier with adhesive, means adapted to move said magazine toward and from said carrier and thereby cause a cover-blank from the magazine to become adhesively attached to said body-blank in superposed relation with the side of the cover-blank extending beyond the side of the body-blank, means adapted to fold the extended side of the cover-blank around the side of the body-blank, means adapted to transfer the composite blank to said former, and means adapted to fold the composite blank around said former.

25. In an apparatus of the character described, in combination, a translatable carrier adapted to support a body-blank, a translatable former, a dauber translatable with and movable transversely of the supporting face of said carrier, means adapted to feed a body-blank to said carrier, means adapted to coat said dauber and the body-blank on said carrier with adhesive, means adapted to feed a cover-blank into superposed relation with the adhesive charged faces of said body-blank and said dauber, with the side of the cover-blank extending beyond the side of the body-blank, means adapted to fold the extended side of the cover-blank around the side of the body-blank, means adapted to transfer the composite blank to said former, and means adapted to fold the composite blank around said former.

26. In an apparatus of the character described, in combination, a translatable carrier adapted to support a body blank, a translatable former, a dauber translatable with and movable transversely of the supporting face of said carrier, means adapted to feed a body-blank to said carrier, means adapted to coat said dauber and the body-blank on said carrier with adhesive, means adapted to feed a cover-blank into superposed relation with the adhesive charged faces of said body-blank and said dauber, with the side of the cover-blank extending beyond the side of the body-blank, means adapted to cause said dauber to be flush with the adhesive charged face of said body-blank when the cover-blank is placed on said body-blank, means adapted to fold the extended side of the cover-blank around the side of the body-blank, means adapted to transfer the composite blank to said former, and means adapted to fold the composite blank around said former.

27. In an apparatus of the character described, in combination, a translatable carrier adapted to support a body-blank, a translatable former, means adapted to coöperate with said carrier to adhesively assemble thereon a body-blank and a cover-blank in superposed relation with the sides of the cover-blank extending beyond the sides of the body-blank, means adapted to fold the extended sides of the cover-blank around the sides of the body-blank comprising a pair of oppositely disposed blank supporting levers having angularly disposed folding fingers, means adapted to translate said levers toward and transversely of the blank supporting face of said carrier and thereby cause said fingers to fold the extended sides of the cover-blank across the edges of the body-blank, means adapted to cause said fingers to approach each other and thereby fold the remaining extensions of said sides of the cover-blank onto the opposite face of the body-blank, means adapted to transfer the composite blank to said former, and means adapted to fold the composite blank around said former.

28. In an apparatus of the character described, in combination, a translatable carrier adapted to support a body-blank, a translatable former, means adapted to coöperate with said carrier to adhesively assemble thereon a body-blank and a cover-blank in superposed relation with the sides of the cover-blank extending beyond the sides of the body-blank, means adapted to fold the extended sides of the cover-blank around the sides of the body-blank comprising a pair of oppositely disposed blank supporting levers having angularly disposed folding fingers; means adapted to translate said levers toward and transversely of the blank supporting face of said carrier and thereby cause said fingers to fold the extended sides of the cover-blank across the edges of the body-blank, means adapted to cause said fingers to approach each other and thereby fold the remaining extensions of said sides of the cover-blank onto the opposite face of the body-blank, means adapted to squeeze the interfolded parts of said blanks, means adapted to transfer the composite blank to said former, and means adapted to fold the composite blank around said former.

29. In an apparatus of the character described, in combination, a translatable carrier adapted to support a body-blank, a translatable former, means adapted to coöperate with said carrier to adhesively assemble thereon a body-blank and a cover-blank in superposed relation with the sides of the cover-blank extending beyond the sides of the body-blank, means adapted to fold the extended sides of the cover-blank around the sides of the body-blank comprising a pair of oppositely disposed blank supporting levers having angularly disposed folding fingers, means adapted to translate said levers toward and transversely of the blank supporting face of said carrier and thereby cause said fingers to fold the extended sides of the cover-blank across the edges of the body-blank, means adapted to cause said fingers to approach each other and thereby fold the remaining extensions of said sides of the cover-blank onto the opposite face of the body-blank, a press head between said levers, means adapted to translate said fingers toward said press head and thereby squeeze the interfolded parts of said blanks, means adapted to transfer the composite blank to said former, and means adapted to fold the composite blank around said former.

30. In an apparatus of the character described, in combination, a translatable carrier adapted to support a body-blank, a translatable former, means adapted to coöperate with said carrier to adhesively assemble thereon a body-blank and a cover-blank in superposed relation with the sides of the cover-blank extending beyond the sides of the body-blank, means adapted to fold the extended sides of the cover-blank around the sides of the body-blank comprising a pair of oppositely disposed blank supporting levers having angularly disposed folding fingers, means adapted to translate said levers toward and transversely of the blank supporting face of said carrier and thereby carry said fingers to fold the extended sides of the cover-blank across the edges of the body-blank, means adapted to cause said fingers to approach each other and thereby fold the remaining extensions of said sides of the cover-blank onto the opposite face of the body-blank, a press head between said levers, means adapted to translate said fingers toward said press head and thereby squeeze the interfolded parts of said blanks, means adapted thereafter to cause relative separating movement between said fingers and head while retaining said fingers in their approached position, means adapted to transfer the composite blank to said former, and means adapted to fold the composite blank around said former.

31. In an apparatus of the character described, in combination, a translatable carrier adapted to support a body-blank, a translatable former, means adapted to coöperate with said carrier to adhesively assemble thereon a body-blank and a cover-blank in superposed relation with the sides of the cover-blank extending beyond the sides of the body-blank, means adapted to fold the extended sides of the cover-blank around the sides of the body-blank comprising a pair of oppositely disposed blank supporting levers having angularly disposed folding fingers, means adapted to translate said levers toward and transversely of the blank supporting face of said carrier and thereby cause said fingers to fold the extended sides of the cover-blank across the edges of the body-blank, means adapted to cause said fingers to approach each other and thereby fold the remaining extensions of said sides of the cover-blank onto the opposite face of the body-blank, a press head between said levers, means adapted to translate said fingers toward said press head and thereby squeeze the interfolded parts of said blanks, means adapted thereafter to cause relative separating movement between said fingers and head while retaining said fingers in their approached position, means adapted to transfer the composite blank to said former, comprising means adapted to translate said levers away from the blank supporting face of said carrier while the fingers are in their approached position, and means adapted to fold the composite blank around said former.

32. In an apparatus of the character described, in combination, a translatable carrier adapted to support a body-blank, a translatable former, means adapted to coöperate with said carrier to adhesively assemble thereon a body-blank and a cover-blank in superposed relation with the sides of the cover-blank extending beyond the sides of the body-blank, means adapted to fold the extended sides of the cover-blank around the sides of the body-blank, comprising two supports guided to move toward and from said carrier, a pair of oppositely disposed blank supporting and folding jaws pivoted on one of said supports, a blank supporting and pressing head on the other support between said jaws, cams, means operatively connected to one of said cams and adapted to translate said jaws toward and from said carrier, means mounted on said jaw carrying support and operatively connected to another of said cams adapted to cause said jaws to approach and recede from each other, the translating means for one of said supports comprising a toggle operatively connected to a third cam, means adapted to transfer the composite blank to said former, and means adapted to fold the composite blank around said former.

33. In an apparatus of the character described, in combination, a translatable carrier adapted to support a body-blank, a translatable former, means adapted to coöperate with said carrier to adhesively assemble thereon a body-blank and a cover-blank in superposed relation with the sides of the cover-blank extending beyond the sides of the body-blank, comprising a dauber translatable with and movable transversely of the supporting face of said carrier to and from a plane flush with the outer face of a body-blank thereon, said dauber being disposed opposite the extended sides of the cover-blank, means adapted to fold the extended sides of the cover-blank around the sides of the body-blank, and means adapted to dispose said dauber in a plane spaced from the outer face of the body-blank during said folding operation.

34. In an apparatus of the character described, in combination, a translatable carrier adapted to support a body-blank, a translatable former, means adapted to coöperate with said carrier to adhesively assemble thereon a body-blank and a cover-blank in superposed relation with the side of the cover-blank extending beyond the side of the body-blank, comprising a dauber translatable with said carrier and adapted to contact with the extended side of said cover-blank, means adapted to feed a body-blank to said carrier, means adapted to cause said dauber to be spaced from the supporting face of said carrier when a body-blank is applied to said carrier, means adapted to dispose said dauber in a position flush with the outer face of the body-blank on the carrier, means adapted to simultaneously coat said dauber and the outer face of said body-blank with adhesive, means adapted to dispose a cover-blank on the adhesive covered face of said body-blank and the sides of said cover-blank on the adhesive coated face of said dauber, means adapted to fold the extended sides of the cover-blank around the sides of the body-blank, means adapted to transfer the composite blank to said former, and means adapted to fold the composite blank around said former.

35. In an apparatus of the character described, in combination, a translatable carrier adapted to support a body-blank, a translatable former, means adapted to co-operate with said carrier to adhesively assemble thereon a body-blank and a cover-blank in superposed relation with the side of the cover-blank extending beyond the side of the body-blank, comprising a dauber translatable with said carrier and adapted to contact with the extended side of said cover-blank, means adapted to feed a body-blank to said carrier, means adapted to cause said dauber to be spaced from the supporting face of said carrier when a body-blank is applied to said carrier, means adapted to dispose said dauber in a position flush with the outer face of the body-blank on the carrier, means adapted to simultaneously coat said dauber and the outer face of said body-blank with adhesive, means adapted to dispose a cover-blank on the adhesive covered face of said body-blank and the sides of said cover-blank on the adhesive coated face of said dauber, means adapted to fold the extended sides of the cover-blank around the sides of the body-blank, means adapted to transfer the composite blank to said former, means adapted to fold the composite blank around said former, and means adapted to cause said dauber to be spaced from the adhesive charged face of said body-blank during said first-mentioned folding operation.

36. In an apparatus of the character described, in combination, a translatable carrier adapted to support a body-blank, a translatable former, means adapted to co-operate with said carrier to adhesively assemble thereon a body-blank and a cover-blank in superposed relation with the sides of the cover-blank extending beyond the sides of the body-blank, means adapted to fold the extended sides of the cover-blank around the sides of the body-blank, means adapted to transfer the composite blank to said former comprising a pair of relatively movable translatable gripper jaws, and means adapted to fold the composite blank around said former.

37. In an apparatus of the character described, in combination, a translatable carrier adapted to support a body-blank, a translatable former, means adapted to co-operate with said carrier to adhesively assemble thereon a body-blank and a cover-blank in superposed relation with the sides of the cover-blank extending beyond the sides of the body-blank, means adapted to fold the extended sides of the cover-blank around the sides of the body-blank, means adapted to transfer the composite blank to said former comprising a reciprocatory carriage, a pair of relatively movable gripper jaws translatable with said carriage, a member translatable with and relative to said carriage adapted to effect relative movement of said gripper jaws, and means adapted to fold the composite blank around said former.

38. In an apparatus of the character described, in combination, a translatable carrier adapted to support a body-blank, a translatable former, means adapted to co-operate with said carrier to adhesively assemble thereon a body-blank and a cover-blank in superposed relation with the sides of the cover-blank extending beyond the sides of the body-blank, means adapted to fold the extended sides of the cover-blank around the sides of the body-blank, means adapted to transfer the composite blank to said former comprising a reciprocatory carriage, a pair of relatively movable gripper jaws translatable with said carriage, a shaft having threaded engagement with said carriage and operatively connected to cause relative movement of said gripper jaws, means adapted to rock said shaft, and means adapted to fold the composite blank around said former.

39. In an apparatus of the character described, in combination, a translatable carrier adapted to support a body-blank, a translatable former, means adapted to co-operate with said carrier to adhesively assemble thereon a body-blank and a cover-blank in superposed relation with the sides of the cover-blank extending beyond the sides of the body-blank, means adapted to fold the extended sides of the cover-blank around the sides of the body-blank, means adapted to transfer the composite blank to said former comprising a reciprocatory carriage, a pair of relatively movable gripper jaws translatable with said carriage, a threaded sleeve on said carriage, a shaft having threaded engagement with said sleeve, means adapted to rock said shaft, means whereby the longitudinal movement of said shaft relative to said carriage in one direction causes relative gripping movement of said gripper jaws, and means adapted to fold the composite blank around said former.

40. In an apparatus of the character described, in combination, a translatable carrier adapted to support a body-blank, a translatable former, means adapted to coöperate with said carrier to adhesively assemble thereon a body-blank and a cover-blank in superposed relation with the sides of the cover-blank extending beyond the sides of the body-blank, means adapted to fold the extended sides of the cover-blank around the sides of the body-blank, means adapted to transfer the composite blank to said former comprising a reciprocatory carriage, a pair of relatively movable gripper jaws translatable with said carriage, a threaded sleeve on said carriage, a shaft having threaded engagement with said sleeve, means adapted to rock said shaft, means whereby the longitudinal movement of said shaft relative to said carriage in one direction causes relative gripping movement of said gripper jaws, resilient means adapted to effect relative separating movement of said gripper jaws, and means adapted to fold the composite blank around said former.

41. In an apparatus of the character described, in combination, a translatable carrier adapted to pneumatically grip a body-blank, a translatable former, means adapted to coöperate with said carrier to adhesively assemble thereon a body-blank and a cover-blank in superposed relation with the sides of the cover-blank extending beyond the sides of the body-blank, means adapted to fold the extended sides of the cover-blank around the sides of the body-blank while the body-blank is pneumatically gripped to said carrier, means adapted to move the composite blank from said carrier to said former, means adapted to relieve the pneumatic gripping effect on the body-blank before the composite blank is removed from said carrier, and means adapted to fold the composite blank around said former.

42. In an apparatus of the character described, in combination, a translatable carrier adapted to pneumatically grip a body-blank, a translatable former, means adapted to coöperate with said carrier to adhesively assemble thereon a body-blank and a cover-blank in superposed relation with the sides of the cover-blank extending beyond the sides of the body-blank, means adapted to fold the extended sides of the cover-blank around the sides of the body-blank while the body-blank is pneumatically gripped to said carrier, means adapted to move the composite blank from said carrier to said former, means adapted to relieve the pneumatic gripping effect on the body-blank before the composite blank is removed from said carrier, means adapted to pneumatically grip said composite blank to said former, and means adapted to fold the composite blank around said former.

43. In an apparatus of the character described, in combination, a translatable carrier adapted to pneumatically grip a body-blank, a translatable former, means adapted to coöperate with said carrier to adhesively assemble thereon a body-blank and a cover-blank in superposed relation with the sides of the cover-blank extending beyond the sides of the body-blank, means adapted to fold the extended sides of the cover-blank around the sides of the body-blank while the body-blank is pneumatically gripped to said carrier, means adapted to move the composite blank from said carrier to said former, means adapted to relieve the pneumatic gripping effect on the body-blank before the composite blank is removed from said carrier, means adapted to pneumatically grip said composite blank to said former, means adapted to release the moving means from said composite blank after the latter is gripped to said former, and means adapted to fold the composite blank around said former.

44. In an apparatus of the character described, in combination, a translatable carrier adapted to support a body-blank, a translatable former, means adapted to coöperate with said carrier to adhesively assemble thereon a body-blank and a cover-blank in superposed relation with the sides of the cover-blank extending beyond the sides of the body-blank, means adapted to fold the extended sides of the cover-blank around the sides of the body-blank, means adapted to transfer the composite blank to said former, means adapted to pneumatically grip a portion of said composite blank to said former, and means adapted to fold the composite blank around said former.

45. In an apparatus of the character described, in combination, a translatable carrier adapted to support a body-blank, a translatable former, means adapted to coöperate with said carrier to adhesively assemble thereon a body-blank and a cover-blank in superposed relation with the sides of the cover-blank extending beyond the sides of the body-blank, means adapted to fold the extended sides of the cover-blank around the sides of the body-blank, means adapted to transfer the composite blank to said former, means adapted to pneumatically grip an intermediate portion of said composite blank to said former, means adapted to fold the outer portions around said former and superpose the ends of the composite blank, and means adapted to pneumatically grip one of said ends to said former.

46. In an apparatus of the character described, in combination, a translatable carrier adapted to support a body-blank, a translatable former, means adapted to cooperate with said carrier to adhesively assemble thereon a body-blank and a cover-blank in superposed relation with the sides of the cover-blank extending beyond the sides of the body-blank, means adapted to fold the extended sides of the cover-blank around the sides of the body-blank, means adapted to transfer the composite blank to said former, means adapted to pneumatically grip an intermediate portion of said composite blank to said former, means adapted to fold the adjacent outer portions against the opposite sides of said former, means adapted to fold one end of said composite blank against said former and pneumatically grip the same thereto, and means adapted to thereafter fold the opposite end of said composite blank onto said first folded end.

47. In an apparatus of the character described, in combination, a translatable carrier adapted to support a body-blank, a translatable former, means adapted to cooperate with said carrier to adhesively assemble thereon a body-blank and a cover-blank in superposed relation with the sides of the cover-blank extending beyond the sides of the body-blank, means adapted to fold the extended sides of the cover-blank around the sides of the body-blank, means adapted to transfer the composite blank to said former, and means adapted to fold the composite blank around said former comprising blank folding devices respectively disposed on opposite sides of the path of the former in the path of the opposite ends of the composite blank.

48. In an apparatus of the character described, in combination, a translatable carrier adapted to support a body-blank, a translatable former, means adapted to cooperate with said carrier to adhesively assemble thereon a body-blank and a cover-blank in superposed relation with the sides of the cover-blank extending beyond the sides of the body-blank, means adapted to fold the extended sides of the cover-blank around the sides of the body-blank, means adapted to transfer the composite blank to said former, and means adapted to fold the composite blank around said former comprising a pair of blank folding devices between which the former moves and adapted to oscillate transversely of the path of the former.

49. In an apparatus of the character described, in combination, a translatable carrier adapted to support a body-blank, a translatable former, means adapted to cooperate with said carrier to adhesively assemble thereon a body-blank and a cover-blank in superposed relation with the sides of the cover-blank extending beyond the sides of the body-blank, means adapted to fold the extended sides of the cover-blank around the sides of the body-blank, means adapted to transfer the composite blank to said former, and means adapted to fold the composite blank around said former comprising a pair of blank-folding rollers between which the former moves and adapted to oscillate transversely of the path of the former.

50. In an apparatus of the character described, in combination, a translatable carrier adapted to support a body-blank, a translatable former, means adapted to cooperate with said carrier to adhesively assemble thereon a body-blank and a cover-blank in superposed relation with the sides of the cover-blank extending beyond the sides of the body-blank, means adapted to fold the extended sides of the cover-blank around the sides of the body-blank, means adapted to transfer the composite blank to said former, and means adapted to fold the composite blank around said former comprising a pair of keepers between which the formers move adapted to retain the blank in partially folded condition on said former.

51. In an apparatus of the character described, in combination, a translatable carrier adapted to support a body-blank, a translatable former, means adapted to cooperate with said carrier to adhesively assemble thereon a body-blank and a cover-blank in superposed relation with the sides of the cover-blank extending beyond the sides of the body-blank, means adapted to fold the extended sides of the cover-blank around the sides of the body-blank, means adapted to transfer the composite blank to said former, and means adapted to fold the composite blank around said former comprising a pair of resilient plates between which the formers move adapted to retain the blank in partially folded condition on said former.

52. In an apparatus of the character described, in combination, a translatable carried adapted to support a body-blank, a translatable former, means adapted to cooperate with said carrier to adhesively assemble thereon a body-blank and a cover-blank in superposed relation with the sides of the cover-blank extending beyond the sides of the body-blank, means adapted to fold the extended sides of the cover-blank around the sides of the body-blank, means adapted to transfer the composite blank to said former, and means adapted to fold the composite blank around said former comprising two pairs of blank-folding devices between the members of each pair of which the formers move, one of said pair being adapted to oscillate transversely of the path of said former.

53. In an apparatus of the character described, in combination, a translatable carrier adapted to support a body-blank, a translatable former, means adapted to coöperate with said carrier to adhesively assemble thereon a body-blank and a cover-blank in superposed relation with the sides of the cover-blank extending beyond the sides of the body-blank, means adapted to fold the extended sides of the cover-blank around the sides of the body-blank, means adapted to transfer the composite blank to said former, and means adapted to fold the composite blank around said former comprising a pair of blank-folding devices spring pressed toward the former and between which the former moves and adapted to oscillate transversely of the path of the former.

54. In an apparatus of the character described, in combination, a translatable carrier adapted to support a body-blank, a translatable former, means adapted to coöperate with said carrier to adhesively assemble thereon a body-blank and a cover-blank in superposed relation with the sides of the cover-blank extending beyond the sides of the body-blank, means adapted to fold the extended sides of the cover-blank around the sides of the body-blank, means adapted to transfer the composite blank to said former, means adapted to fold the composite blank around said former and produce a shell, and means adapted to remove the shell from said former.

55. In an apparatus of the character described, in combination, a translatable carrier adapted to support a body-blank, a translatable former having a free end, means adapted to coöperate with said carrier to adhesively assemble thereon a body-blank and a cover-blank in superposed relation with the sides of the cover-blank extending beyond the sides of the body-blank, means adapted to fold the extended sides of the cover-blank around the sides of the body-blank, means adapted to transfer the composite blank to said former, and means adapted to fold the composite blank around said former and produce a shell comprising a device disposed to contact an edge of the shell and push the shell from the former.

56. In an apparatus of the character described, in combination, a translatable carrier adapted to support a body-blank, a translatable former, means adapted to coöperate with said carrier to adhesively assemble thereon a body-blank and a cover-blank in superposed relation with the sides of the cover-blank extending beyond the sides of the body-blank, means adapted to fold the extended sides of the cover-blank around the sides of the body-blank, means adapted to transfer the composite blank to said former, means adapted to fold the composite blank around said former and produce a shell, a tray support, and means adapted to eject the shell from said former and telescope the same with a tray on said support.

57. In an apparatus of the character described, in combination, a translatable carrier adapted to support a body-blank, a translatable former, means adapted to coöperate with said carrier to adhesively assemble thereon a body-blank and a cover-blank in superposed relation with the sides of the cover-blank extending beyond the sides of the body-blank, means adapted to fold the extended sides of the cover-blank around the sides of the body-blank, means adapted to transfer the composite blank to said former, means adapted to fold the composite blank around said former and produce a shell, means adapted to feed trays to said tray support into alinement with a predetermined position of said former, and means adapted to push the shell from said former over a tray on said support.

58. In an apparatus of the character described, in combination, an intermittently translatable carrier, a carriage adjacent a position of rest of said carrier, means adapted to intermittently feed a web onto said carriage, means adapted to move said carriage toward and from said carrier, and means whereby the movement of said carriage toward said carrier causes said web to be severed and the severed blank to be conveyed to said carrier.

59. In an apparatus of the character described, in combination, an intermittently translatable carrier, a carriage adjacent a position of rest of said carrier, said carriage comprising a knife movable therewith, means adapted to intermittently feed a web onto said carriage, a stationary knife, and means adapted to move said carriage toward and from said carrier whereby said knives coöperate to sever a blank from said web and said carriage conveys said blank to said carrier.

60. In an apparatus of the character described, in combination, an intermittently translatable carrier, a carriage adjacent a position of rest of said carrier, means adapted to intermittently feed a web onto said carriage, a stop on said carriage in the path of said web, a gripper jaw, a knife movable with said carriage, a stationary knife, means adapted to cause movement of said jaw to grip said web to said carriage, means adapted to move said carriage toward and from said carrier whereby said knives coöperate to sever a blank from said web, and said carriage conveys said blank to said carrier, and means adapted to relieve the grip of said jaw when said blank is seated on said carrier.

61. In an apparatus of the character described, in combination, an intermittently translatable carrier having a pneumatic gripper blank supporting face, a carriage adjacent a position of rest of said carrier, means adapted to intermittently feed a web onto said carriage, means adapted to move said carriage toward and from said carrier, means whereby the movement of said carriage toward said carrier causes said web to be severed and the severed blank to be conveyed to said blank supporting face, and means adapted to energize said gripper when said blank is applied to said face.

62. In an apparatus of the character described, in combination, an intermittently translatable carrier having a pneumatic gripper blank supporting face, a carriage adjacent a position of rest of said carrier, means adapted to intermittently feed a web onto said carriage, means adapted to move said carriage toward and from said carrier, means whereby the movement of said carriage toward said carrier causes said web to be severed and the severed blank to be conveyed to said blank supporting face, an exhaust mechanism adapted to energize said pneumatic gripper face, a valve controlling communication between said exhaust mechanism and said pneumatic gripper, and a connection between said valve and said carriage adapted to operate said valve.

63. In an apparatus of the character described, in combination, a translatable carrier on which a blank is adapted to be supported, a dauber translatable with said carrier, means adapted to simultaneously coat said blank and said dauber with adhesive, and means adapted to apply another blank to the adhesive coated faces of said dauber and said first-mentioned blank.

64. In an apparatus of the character described, in combination, a translatable carrier on which a blank is adapted to be supported, a dauber translatable with said carrier, means adapted to simultaneously coat said blank and said dauber with adhesive when said carrier is moving, and means adapted to apply another blank to the adhesive coated faces of said dauber and said first-mentioned blank.

65. In an apparatus of the character described, in combination, a translatable carrier on which a blank is adapted to be supported, a dauber translatable with said carrier, means adapted to move said dauber into and out of position flush with the outer face of the blank on said carrier, means adapted to coat said blank and said dauber with adhesive when the dauber is in said flush position, and means adapted to apply another blank to the adhesive coated faces of said dauber and said first-mentioned blank.

66. In an apparatus of the character described, in combination, a translatable carrier on which a blank is adapted to be supported, a dauber translatable with said carrier, a roller adapted to simultaneously coat said blank and said dauber with adhesive, means adapted to press said roller uniformly on the face of said dauber when applying adhesive to said dauber, and means adapted to apply another blank to the adhesive coated faces of said dauber and said first-mentioned blank.

67. In an apparatus of the character described, in combination, a translatable carrier on which a blank is adapted to be supported, a dauber translatable with said carrier, a roller adapted to simultaneously coat said blank and said dauber with adhesive, means adapted to press said roller uniformly on the face of said dauber when applying adhesive to said dauber, comprising a cam adapted to move said roller away from said dauber and a spring adapted to move said roller toward said dauber, and means adapted to apply another blank to the adhesive coated faces of said dauber and said first-mentioned blank.

68. In an apparatus of the character described, in combination, a translatable carrier on which an adhesive coated blank is adapted to be supported, an adhesive coated dauber translatable with said carrier and disposed at the side of said blank, and means adapted to apply another blank to the adhesive coated faces of said dauber and said first-mentioned blank.

69. In an apparatus of the character described, in combination, a translatable carrier on which an adhesive coated blank is adapted to be supported, an adhesive coated dauber translatable with said carrier and disposed at the side of said blank, and means adapted to apply another blank simultaneously to the adhesive coated faces of said dauber and said first-mentioned blank.

70. In an apparatus of the character described, in combination, a translatable carrier on which an adhesive coated blank is adapted to be supported, an adhesive coated dauber translatable with said carrier and movable into and out of position flush with the adhesive coated face of said blank at the side of said blank, means adapted to apply another blank to the adhesive coated faces of said dauber and said first-mentioned blank, and means adapted to position said dauber in said flush position when said second-mentioned blank is applied thereto.

71. In an apparatus of the character described, in combination, a translatable carrier on which an adhesive coated blank is adapted to be supported, an adhesive coated dauber translatable with said carrier and disposed at the side of said blank, a blank magazine, and means adapted to move said magazine and cause a blank therein to be applied to the adhesive coated faces of said dauber and said first-mentioned blank.

72. In an apparatus of the character described, in combination, a translatable carrier adapted to support a pair of superposed blanks with the opposite sides of one blank extending beyond the opposite sides of the other, a conveyer comprising oppositely disposed folding members, means adapted to move said conveyer toward and from said carrier, and means adapted to cause said members to fold the extended sides of said blank around the sides of the other blank.

73. In an apparatus of the character described, in combination, a translatable carrier adapted to support a pair of superposed blanks with the opposite sides of one blank extending beyond the opposite sides of the other, a conveyer comprising oppositely disposed folding members, means adapted to move said conveyer toward and from said carrier, means adapted to cause said members to fold the extended sides of said blank around the sides of the other blank, and means adapted to coöperate with said members to squeeze the interfolded sides of said blanks.

74. In an apparatus of the character described, in combination, a translatable carrier adapted to support a pair of superposed blanks, with the opposite sides of one blank extending beyond the opposite sides of the other, a conveyer comprising oppositely disposed folding members, means adapted to move said conveyer toward and from said carrier, means adapted to cause said members to fold the extended sides of said blank around the sides of the other blank, and means adapted to coöperate with said carrier to grip the blanks therebetween during said folding operation.

75. In an apparatus of the character described, in combination, a translatable carrier adapted to support a pair of superposed blanks, with the opposite sides of one blank extending beyond the opposite sides of the other, a conveyer comprising oppositely disposed folding members, means adapted to move said conveyer toward and from said carrier, and means adapted to cause said members to fold the extended sides of said blank around the sides of the other blank while on said carrier, and thereafter coöperate in removing the blanks from said carrier.

76. In an apparatus of the character described, in combination, a translatable carrier adapted to support a pair of superposed blanks, with the opposite sides of one blank extending beyond the opposite sides of the other, a conveyer comprising oppositely disposed folding members and a press head between said members, means adapted to move said conveyer toward and from said carrier, means whereby said folding members are disposed to engage the extended sides of said blank to first move the same across the edges of the other blank and then down against the opposite face of said other blank, and means adapted to cause relative movement between said members and said head transversely of said blanks to squeeze the interfolded portions.

77. In an apparatus of the character described, in combination, a press head, two members each having folding fingers adapted to be disposed at opposite ends of said head, means adapted to move said head and fingers simultaneously in one direction normal to said head, means adapted to move said fingers transversely of said normal movement, and means adapted to move said fingers in an opposite direction normal to said head.

78. In an apparatus of the character described, in combination, a supporting guide, slides movable in said guide, a press head carried by one slide and extending transversely of the direction of movement thereof, folding fingers pivoted on said other slide and adapted to move transversely of the direction of movement thereof, means adapted to move said slides independently of each other, and means adapted to simultaneously move said fingers toward and from each other.

79. In an apparatus of the character described, in combination, a supporting guide, slides movable in said guide, a press head carried by one slide and extending transversely of the direction of movement thereof, folding fingers pivoted on said other slide and adapted to move transversely of the direction of movement thereof, a cam shaft, cams thereon, a lever connected to one slide and coöperating with one of said cams to cause reciprocatory movement of said finger-carrying slide, a toggle connecting said lever and said head-carrying slide, a follower link connected to said toggle and coöperating with another of said cams to cause reciprocation of said head-carrying slide, a lever coöperating with another of said cams, and connections between said last-mentioned lever and said folding fingers adapted to cause relative approaching and receding movement of said fingers.

80. In an apparatus of the character described, in combination, a conveyer comprising a press head and oppositely disposed folding fingers adapted to grip a blank, means adapted to reciprocate said conveyer, means adapted to cause relative movement between said head and fingers normal to said head, a pair of gripper jaws movable transversely to the line of movement of said conveyer, means adapted to move said jaws to and cause them to grip a blank held by said conveyer, and means adapted to move said jaws away from said conveyer.

81. In an apparatus of the character described, in combination, an intermittently translatable former having a pneumatic gripper blank supporting face, a pair of gripper jaws translatable transversely of the path of movement of said former, means adapted to cause said jaws to grasp a blank and move the same into the path of said former opposite said pneumatic gripper face, means adapted to energize said gripper and thereby cause said blank to be gripped to said former, and means adapted to cause said jaws to release said blank after said pneumatic gripper is energized.

82. In an apparatus of the character described, in combination, a translatable former adapted to support a blank with the opposite ends thereof projecting from opposite sides of the former, a pair of rollers respectively disposed at opposite sides of the path of the former in the path of said extended ends of said blank, means adapted to move said rollers transversely of the path of said former, and means adapted to yieldingly press said rollers toward said former during their transverse movement.

83. In an apparatus of the character described, in combination, an intermittently translatable former adapted to support a blank with the opposite sides thereof projecting from opposite sides of the former, a pair of folders respectively disposed at opposite sides of the path of the former in the path of said extended ends of said blank, and a pair of keepers between which the folded blank is positioned when said former is at a predetermined position of rest.

84. In an apparatus of the character described, in combination, a pair of rollers spaced apart, a former adapted to move a partially folded blank between said rollers, said blank having opposite ends extending between said rollers, and means adapted to oscillate said pair of rollers as a unit first in one direction, then in an opposite direction transversely of the path of said former.

85. In an apparatus of the character described, in combination, a carrier comprising a blank supporting face, and a dauber movable synchronously with said carrier, and relative to said face.

86. In an apparatus of the character described, in combination, a rotatable arm, a carrier face rotatable with said arm, a dauber disposed at one side of said carrier and movable transversely of said face, and means for resiliently moving said dauber in said transverse direction.

87. In an apparatus of the character described, in combination, a rotatable arm, a carrier face rotatable with said arm, a dauber disposed at one side of said carrier and movable transversely of said face, means for resiliently moving said dauber in said transverse direction, and an adjustable stop to limit said last-mentioned movement.

88. In an apparatus of the character described, in combination, a rotatable arm, a carrier face thereon, a slide guided to move radially on said arm, a dauber disposed at opposite sides of said face and supported by said slide, and means adapted to radially reciprocate said slide.

89. In an apparatus of the character described, in combination, a rotatable arm, a carrier face thereon, a slide guided to move radially on said arm, a dauber disposed at opposite sides and an end of said face and supported by said slide, means adapted to positively move said slide inwardly, and means adapted to resiliently urge said slide outwardly.

90. In an apparatus of the character described, in combination, a rotatable arm, a carrier face thereon, a slide guided to move radially on said arm, a dauber disposed at opposite sides of said face and supported by said slide, means adapted to positively move said slide inwardly, means adapted to resiliently urge said slide outwardly, and means adapted to limit the outward movement of said slide.

91. In an apparatus of the character described, in combination, a rotatable arm, a pneumatic gripper carrier face thereon, a slide guided to move radially on said arm, a dauber disposed at opposite sides of said face and supported by said slide, and means adapted to radially reciprocate said slide.

92. In an apparatus of the character described, in combination, a rotatable arm, a carrier face thereon, a slide guided to move radially on said arm, a dauber disposed at opposite sides of said face and supported by said slide, means comprising a fixed cam adapted to positively move said slide inwardly, and means adapted to resiliently urge said slide outwardly.

93. In an apparatus of the character described, in combination, a rotatable former arm having opposite blank-supporting faces, said arm having independent chambers and openings establishing communication between said faces and said chambers, respectively, an exhaust device adapted to communicate with said chambers, and a valve adapted to control communication between said device and said respective chambers.

94. In an apparatus of the character described, in combination, a plurality of blank supporting faces adapted to move in an endless path, a dauber for each face adapted to move therewith as said faces move in said endless path, and means adapted to move said daubers transversely of said supporting faces, said means comprising mechanism adapted to independently cause transverse movement of said daubers at different predetermined points in said endless path.

95. In an apparatus of the character described, in combination, a blank supporting face having openings leading thereto, a dauber adapted to move transversely of said face at the side thereof, means adapted to reciprocate said dauber transversely of said supporting face, an exhaust device adapted to communicate with said openings, and means adapted to control communication between said exhaust device and said openings.

96. In an apparatus of the character described, in combination, a plurality of blank supporting faces having openings leading thereto and adapted to move in an endless path, a dauber for each face adapted to move therewith as said faces move in said endless path, means adapted to move said daubers transversely of said supporting faces, said means comprising mechanism adapted to independently cause transverse movement of said daubers at different predetermined points in said endless path, exhaust mechanism adapted to communicate with the openings in each face, and means adapted to control communication between said exhaust mechanism and the openings in said several faces.

97. In an apparatus of the character described, in combination, a rotatable member having passageways, a series of blank supporting faces carried thereby having openings communicating with said passageways, respectively, daubers mounted on said member and adapted to reciprocate transversely of said faces, said daubers being positioned at the side of said faces, respectively, exhaust mechanism adapted to communicate with said passageways, means adapted to control communication between said exhaust mechanism and said passageways, respectively, and means adapted to cause said transverse movement of said daubers.

98. In an apparatus of the character described, in combination, a rotatable member having passageways, a series of blank supporting faces carried thereby having openings communicating with said passageways, respectively, daubers mounted on said member and adapted to reciprocate transversely of said faces, said daubers being positioned at the side of said faces, respectively, exhaust mechanism adapted to communicate with said passageways, means adapted to control communication between said exhaust mechanism and said passageways, respectively, and means adapted to cause said transverse movement of said daubers comprising a fixed trackway adapted to coöperate with said daubers to positively move them in one direction of their reciprocation.

99. In an apparatus of the character described, in combination, a rotatable member having passageways, a series of blank supporting faces carried thereby having openings communicating with said passageways, respectively, daubers mounted on said member and adapted to reciprocate transversely of said faces, said daubers being positioned at the side of said faces, respectively, exhaust mechanism adapted to communicate with said passageways, means adapted to control communication between said exhaust mechanism and said passageways, respectively, and means adapted to cause said transverse movement of said daubers comprising a fixed trackway adapted to coöperate with said daubers to positively move them in one direction of their reciprocation and spring means adapted to cause their movement in the opposite direction.

100. In an apparatus of the character described, in combination, a rotatable member having passageways, a series of blank supporting faces carried thereby having openings communicating with said passageways, respectively, daubers mounted on said member and adapted to reciprocate transversely of said faces, said daubers being positioned at the side of said faces, respectively, and comprising followers, exhaust mechanism adapted to communicate with said passageways, means adapted to control communication between said exhaust mechanism and said passageways, respectively, and means adapted to cause said transverse movement of said daubers comprising a cam with which said followers engage to effect transverse movement of said daubers in one direction of their reciprocation.

101. In an apparatus of the character described, in combination, a rotatable member having passageways, a series of blank supporting faces carried thereby having openings communicating with said passageways, respectively, daubers mounted on said member and adapted to reciprocate transversely of said faces, said daubers being positioned at the side of said faces, respectively, and comprising followers, exhaust mechanism adapted to communicate with said passageways, means adapted to control communication between said exhaust mechanism and said passageways, respectively, and means adapted to cause said transverse movement of said daubers comprising a fixed trackway having independent cam portions and an intermediate concentric portion with which said followers contact at predetermined times during rotation of said member.

102. In an apparatus of the character described, in combination, a former, means adapted to cause a shell to be disposed in telescopic relation on said former, means adapted to feed a tray, and a stripper movable relative to said former adapted to discharge said shell from the former and assemble the same with said tray.

103. In an apparatus of the character described, in combination, an intermittently movable shell support, tray feeding mechanism, and means adapted to operate to move a shell relative to said former while said former is at rest and assemble the same with a tray supplied by said tray feeding mechanism.

104. In an apparatus of the character described, in combination, a series of intermittently movable formers adapted to telescopically support shells, respectively, means adapted to operate to strip said shells from said formers in succession, and mechanism adapted to move trays into position to receive the shells stripped from said formers.

105. In an apparatus of the character described, in combination, a series of intermittently movable formers adapted to telescopically support shells, respectively, mechanism adapted to move trays successively into position adjacent a station of rest in the path of said formers, and means adapted to discharge shells from said formers into telescopic relation with trays at said station of rest.

106. In an apparatus of the character described, in combination, a series of intermittently movable formers adapted to telescopically support shells, respectively, mechanism adapted to move trays successively into position adjacent a station of rest in the path of said formers, and means movable relatively to said formers adapted to discharge shells from said formers into telescopic relation with trays at said station of rest.

107. In an apparatus of the character described, in combination, a series of intermittently movable formers adapted to telescopically support shells, respectively, mechanism adapted to move trays successively into position adjacent a station of rest in the path of said formers, means adapted to discharge shells from said formers into telescopic relation with trays at said station of rest, and means adapted to yieldingly grip said trays while being assembled with said shells.

108. In an apparatus of the character described, in combination, a series of intermittently movable formers adapted to telescopically support shells, respectively, mechanism adapted to move trays successively into position adjacent a station of rest in the path of said formers, and means movable relatively to said formers adapted to positively discharge shells from said formers into telescopic relation with trays at said station of rest.

109. In an apparatus of the character described, in combination, a series of intermittently movable formers adapted to telescopically support shells, respectively, mechanism adapted to move trays successively into position adjacent a station of rest in the path of said formers, means movable relatively to said formers adapted to discharge shells from said formers into telescopic relation with trays at said station of rest, and a yielding stop in the path of said trays against which they rest when being assembled with said shells.

110. In an apparatus of the character described, in combination, a series of intermittently movable formers adapted to telescopically support shells, respectively, mechanism adapted to move trays successively into position adjacent a station of rest in the path of said formers, means adapted to positively discharge shells from said formers into telescopic relation with trays at said station of rest, and means adapted to yieldingly grip said trays while being assembled with said shells.

111. In an apparatus of the character described, in combination, blank supply mechanism, blank folding mechanism, tray feeding mechanism, and means whereby said mechanisms automatically coöperate to successively fold into shells the blanks from the supply mechanism and assemble said shells with trays supplied by said tray feeding mechanism.

112. In an apparatus of the character described, in combination, blank supply mechanism, comprising a blank magazine, a web feeding device, means adapted to sever blanks from said web, mechanism adapted to adhesively assemble successive blanks from the magazine with successive blanks from the web, blank folding mechanism, tray feeding mechanism, and means whereby said mechanisms automatically coöperate to successively fold into shells the blanks from the supply mechanism and assemble said shells with trays supplied by said tray feeding mechanism.

113. In an apparatus of the character described, in combination, blank supply mechanism, blank folding mechanism, comprising a plurality of intermittently movable formers around which the blanks are to be folded, tray feeding mechanism, and means whereby said mechanisms automatically coöperate to cause successive blanks from said supply mechanism to be folded on said formers and subsequently assembled with trays supplied by said tray feeding mechanism.

114. In an apparatus of the character described, in combination, blank supply mechanism comprising a blank magazine, a web feeding device and means adapted to sever blanks from said web, mechanism adapted to adhesively assemble successive blanks from the magazine with successive blanks from the web, blank folding mechanism comprising a plurality of intermittently translatable formers around which successive assembled blanks are to be folded, tray feeding mechanism, and means whereby said mechanisms automatically coöperate to cause successive blanks from said supply mechanism to be folded on said formers and subsequently assembled with trays supplied by said tray feeding mechanism.

115. In an apparatus of the character described, in combination, blank supply mechanism comprising means adapted to supply body blanks and means adapted to supply cover blanks, mechanism adapted to assemble successive blanks from said supplies, blank folding mechanism comprising a plurality of intermittently translatable formers around which successive assembled blanks are to be folded, tray feeding mechanism, and means whereby said mechanisms automatically coöperate to cause successive blanks from said supply mechanism to be folded on said formers and subsequently assembled with trays supplied by said tray feeding mechanism.

116. In an apparatus of the character described, in combination, blank supply mechanism comprising means adapted to supply body blanks and means adapted to supply cover blanks, mechanism adapted to assemble successive blanks from said supplies comprising a plurality of intermittently translatable blank carriers and daubers associated with the respective carriers and movable toward and from the plane of blanks carried thereby, blank folding mechanism comprising a plurality of intermittently translatable formers around which successive assembled blanks are to be folded, tray feeding mechanism, and means whereby said mechanisms automatically coöperate to cause successive blanks from said supply mechanism to be folded on said formers and subsequently assembled with trays supplied by said tray feeding mechanism.

117. In an apparatus of the character described, in combination, blank supply mechanism comprising means adapted to supply body blanks and means adapted to supply cover blanks, mechanism adapted to assemble successive blanks from said supplies comprising a plurality of intermittently translatable blank carriers and daubers associated with the respective carriers and movable toward and from the plane of blanks carried thereby, blank folding mechanism comprising a plurality of intermittently translatable formers having pneumatic blank gripping faces, around which successive assembled blanks are to be folded, tray feeding mechanism, and means whereby said mechanisms automatically coöperate to cause successive blanks from said supply mechanism to be folded on said formers and subsequently assembled with trays supplied by said tray feeding mechanism.

118. In an apparatus of the character described, in combination, a former, means adapted to fold a blank around said former, said former comprising openings disposed at different points whereby pneumatic gripping of a blank may be effected at different points, and means whereby an opening at one point may be pneumatically energized independently of an opening at another point.

119. In an apparatus of the character described, in combination, a former having openings at different points therearound, means adapted to apply a blank to said former over an opening at one point, means adapted to fold said blank on said former so that a folded part is positioned opposite an opening at a different point, and means adapted to pneumatically energize said openings.

120. In an apparatus of the character described, in combination, a former having openings at different points therearound, means adapted to apply a blank to said former over an opening at one point, means adapted to fold said blank on said former so that a folded part is positioned opposite an opening at a different point, and means adapted to pneumatically energize said openings, the opening opposite the folded part after said other opening.

121. In an apparatus of the character described, in combination, a blank magazine, a movable carriage, a blank carrier intermittently movable in an endless path adapted to alternately assume stationary position opposite said magazine and said carriage, means adapted to feed a web onto said carriage, means adapted to sever said web to leave a blank of web on said carriage, means adapted to cause relative approaching and receding movements between said carriage and carrier when the latter is opposite said carriage thereby transferring the blank of web to said carrier, means adapted to retain said blank of web on said carrier, means adapted to cause relative approaching and receding movements between said carrier and said magazine when the carrier is opposite said magazine thereby transferring a blank from said magazine to the blank on said carrier, and means whereby adhesive is disposed in position to cause said blanks to adhere to each other on said carrier.

122. In an apparatus of the character described, in combination, a blank magazine, a movable carriage, a blank carrier intermittently movable in an endless path, adapted to alternately assume stationary position opposite said magazine and said carriage and having a pneumatic gripper adapted to retain a blank thereon, means adapted to feed a web onto said carriage, means adapted to sever said web to leave a blank of web on said carriage, means adapted to cause said carriage to move toward and from said carrier when the carrier is opposite said carriage thereby transferring said blank of web to said carrier, means adapted to coat said blank of web on said carrier so as to provide an adhesive face thereon, means adapted to move said magazine toward and from said carrier when the latter is opposite said magazine thereby transferring a blank from said magazine onto the adhesive face of said other blank, and means adapted to energize and deënergize said pneumatic gripper at predetermined times.

In testimony whereof we affix our signatures in the presence of two witnesses.

LYNDON C. PALMER.
HAROLD CARLE.

Witnesses:
H. A. ANTRAM,
JNO. O. HOLMES.